(12) United States Patent
Poirier

(10) Patent No.: US 11,322,160 B2
(45) Date of Patent: May 3, 2022

(54) AUDIO COLLECTION SYSTEM AND METHOD FOR SOUND CAPTURE, BROADCAST, ANALYSIS, AND PRESENTATION

(71) Applicant: Darrell Poirier, Woodstock, CT (US)

(72) Inventor: Darrell Poirier, Woodstock, CT (US)

(*) Notice: Subject to any disclaimer, the term of this patent is extended or adjusted under 35 U.S.C. 154(b) by 0 days.

(21) Appl. No.: 17/237,234

(22) Filed: Apr. 22, 2021

(65) Prior Publication Data

US 2021/0335369 A1 Oct. 28, 2021

Related U.S. Application Data

(60) Provisional application No. 63/014,836, filed on Apr. 24, 2020.

(51) Int. Cl.
*G10L 17/26* (2013.01)
*G10L 15/08* (2006.01)
(Continued)

(52) U.S. Cl.
CPC .............. *G10L 17/26* (2013.01); *G10L 15/08* (2013.01); *H04R 1/20* (2013.01); *H04R 7/02* (2013.01);
(Continued)

(58) Field of Classification Search
CPC ........... G10L 17/26; G10L 15/08; H04R 1/20; H04R 7/02; H04R 29/004; H04R 29/005;
(Continued)

(56) References Cited

U.S. PATENT DOCUMENTS 5,956,463 A 9/1999 Partrick et al.
2005/0212912 A1 9/2005 Huster
(Continued)

OTHER PUBLICATIONS https://logistimatics.com/product/mobile-200/; printout of webpage advisting for sale of Mobile-200 product; available on or before Apr. 24, 2020.

(Continued)

*Primary Examiner* — Paul Kim
*Assistant Examiner* — Friedrich Fahnert
(74) *Attorney, Agent, or Firm* — Meagher Emanuel Laks Goldberg & Liao, LLP

(57) ABSTRACT

At least one of the present exemplary embodiments and methods introduces a unique Audio Collection System comprised of self-contained Audio Collection Devices (ACDs), Audio Distribution Devices (ADDs), and Audio Control Analysis (ACA) components/functions. The system may be used to gather audio signals from environments in ways that are not presently available with the intention being to gather audio, analyze, and learn what may be understood about a given environment or situation.
One exemplary feature of this system is that it introduces a set of standardized modular components that can be scaled from a small configuration to larger systems. For example, systems that may manage large numbers of audio input streams, broadcast audio streams, modify audio streams, combine and track sounds, and present sound as immersive experience. Additional features will provide other various controls and statistical capabilities, as described herewith.

14 Claims, 18 Drawing Sheets

(51) Int. Cl.
*H04R 7/02* (2006.01)
*H04R 1/20* (2006.01)
*H04R 29/00* (2006.01)

(52) U.S. Cl.
CPC ......... *H04R 29/004* (2013.01); *H04R 29/005* (2013.01); *H04R 2410/07* (2013.01)

(58) Field of Classification Search
CPC .... H04R 2410/07; H04R 1/083; H04R 1/086; H04R 1/342; H04R 2420/01; H04R 2420/03; H04R 2499/13; H04R 3/005; H04R 3/12; H04S 2400/15
USPC .......................................................... 381/58
See application file for complete search history.

(56) References Cited

U.S. PATENT DOCUMENTS

| | | | | |
|---|---|---|---|---|
| 2008/0027630 A1* | 1/2008 | Chuang | ................ | G01C 21/005 701/408 |
| 2008/0030075 A1* | 2/2008 | Stanley | ................. | H05B 47/19 307/11 |
| 2008/0299899 A1* | 12/2008 | Wolfe | ................. | H04B 1/3805 455/15 |
| 2009/0160673 A1* | 6/2009 | Cirker | .............. | G08B 13/19697 340/12.22 |
| 2010/0325135 A1* | 12/2010 | Chen | .................... | G10H 1/0008 707/759 |
| 2013/0120112 A1* | 5/2013 | Zhao | ........................ | G08C 17/00 340/5.64 |
| 2021/0192629 A1* | 6/2021 | Tofte | ........................ | H04N 5/44 |

OTHER PUBLICATIONS

Datasheet for Mobile-2001, available on or before Apr. 24, 2020.
https://www.amazon.com/Children-Trackers-Tracking-Survival-Monitoring/dp/B07MH5RR97/ref=sr_1_9? dchild=1&keywords=gps+tracker+with+audio&qid=1618859787&sr=8-9; printout of product page on Amazon.com available on or before Apr. 24, 2020.
https://www.amazon.com/Tracker-Activated-Recorder-Recording-Device/dp/B0831B69M5/ref=sr_1_4? dchild=1&keywords=gps+tracker+with+audio&qid=1618859787&sr=8-4; printout of product page on Amazon.com available on or before Apr. 24, 2020.
Printout of webpages from http://www.birdlistener.com/, Aug. 24, 2021.

* cited by examiner

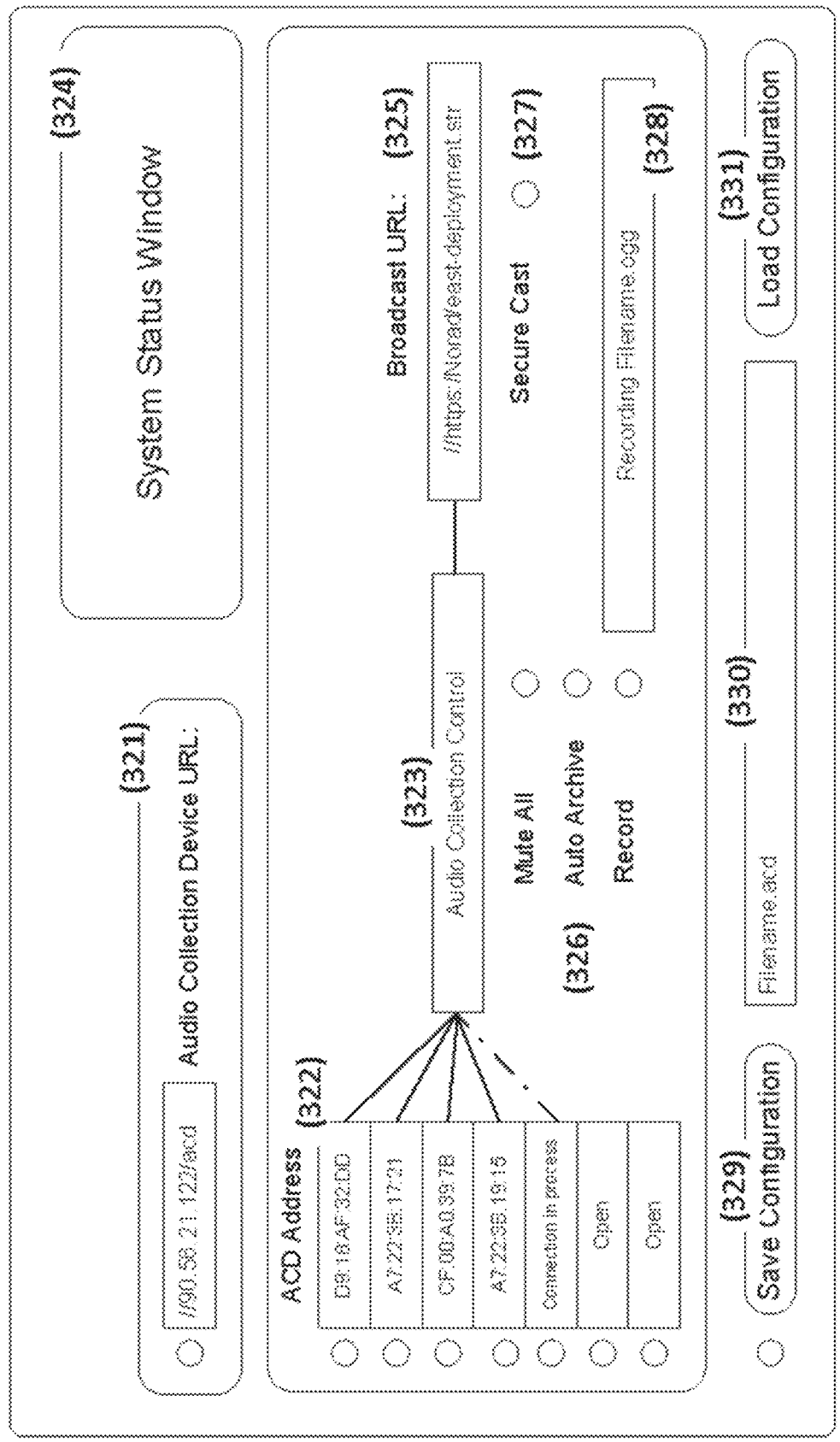

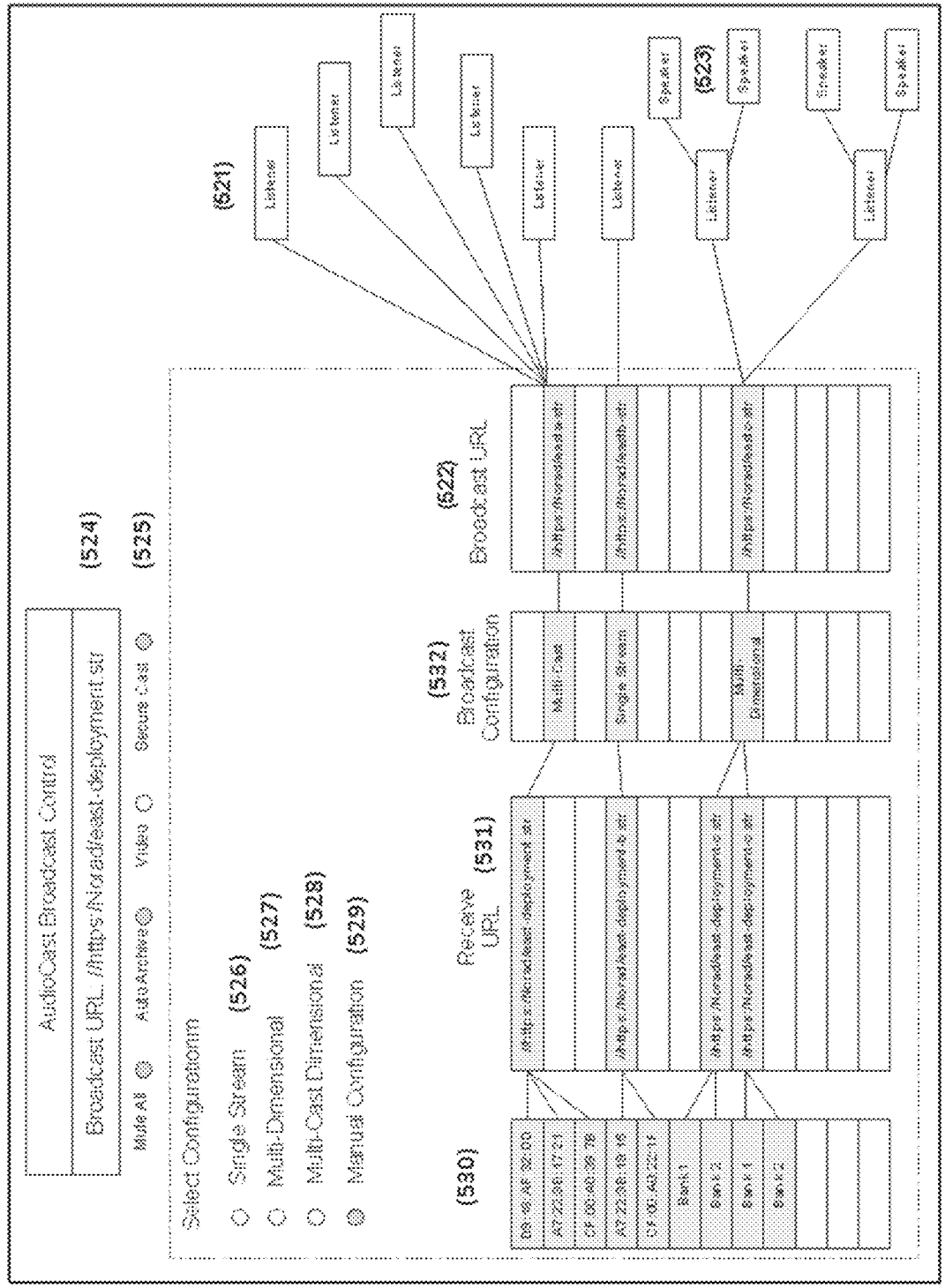
FIGURE 5B - Audio Collection-Cloud Broadcast Distribution Control Screen

AUDIO COLLECTION SYSTEM AND METHOD FOR SOUND CAPTURE, BROADCAST, ANALYSIS, AND PRESENTATION

CROSS-REFERENCE TO RELATED APPLICATIONS

This application claims the priority and all the benefits of U.S. Provisional Application No. 63/014,836 filed on Apr. 24, 2020, the content of which is hereby incorporated by reference in its entirety.

TECHNICAL FIELD

At least one of the present exemplary embodiments and methods provides a unique Audio Collection System comprised of self-contained Audio Collection Devices (ACDs), related apparatuses, Audio Distribution Devices (ADDs), and Audio Control Analysis (ACA) components/functions.

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment, and is not an admission of any prior art.

There are presently many devices and methods for listening to environments including rooms, vehicles, outdoor environments, and etc. Surveillance, security cameras, and video/audio wildlife monitors are some examples.

Some wildlife monitors may include video and/or audio with multiple location monitoring. Some prior systems (e.g., Huster, US 2005/0212912 A1) include several cameras with a microprocessor and wireless connection to send images back to a hosting service that enables a user to review the images and include many additional details like time, temperature, and weather conditions, for example.

Yet another disclosure (i.e., Patrick et al., U.S. Pat. No. 5,956,463A) describes a system that records audio using multiple microphones connected to a single recorder or multiple recorders synchronized and triggered by either a timer or sound pressure event for the purpose of identifying wildlife species by sound.

Another product on the market is the Song Meter SM4 from Wildlife Acoustics Company that records wildlife audio on SD memory cards. Another option is Nature's Window from TMB Studios that provides a microphone connected to a wire that a user hangs out of a window allowing the sounds from outside to be listened to inside via speaker output.

Other devices for capturing sound include devices for spying, monitoring, and recording conversations of phone calls, rooms, or a specific area where a microphone or cell phone may be located. For cell phones there are software apps that turn on the cell phone microphone to allow monitoring the sound around the vicinity of the smart phone.

In addition, many companies have products that range from indoor and exterior mounting, microprocessors for streaming on IP networks, and can also use sound analysis to identify and activate an alarm with the sound of glass breaking, for example, or if gun shots are heard. Louroe is an exemplary company that sells many kinds of microphones and base stations in these categories.

Still other older style technology exists including a microphone combined with a wireless transmitter, frequently referred to as a "bug". Moreover, there is technology available to detect these so-called bugs by detecting the wireless signal being used.

There are many passive techniques to locate the source of a sound going back decades, one example was to use horns of various sizes and configurations where a person's ear would listen through a horn.

Another device called the sound locator uses more recent technology including 3 microphones, an Arduino processor and display to indicate direction of the sound source.

SUMMARY

Present inventor recognizes that previous and existing products are lacking or have problems for broader applications use, cumbersome or will not work at all. Some of the potential disadvantages which the present embodiments aim to overcome are listed below:

1. Lack of immersive audio features

One exemplary need is for use in a home or a business with closed windows or windows that are designed not to be opened, and if a person would like to hear the sounds outside of each window. Typically, there is presently not a system designed for solving this problem.

Moreover, a single, easy to use controller for listening to all windows is not readily available. Physical issues can arise as well, for example, it may not be feasible to hang wires out of windows, or power sources may not be available or reliable.

2. Lack of scalability for single modules to support small to larger environments Presently known systems lack the ability for a single system designed with components to be scaled from a single Audio Collection Device out to nearly unlimited Audio Collection Devices that includes control to enable listening to any one device, any combination of devices, or all of the devices simultaneously.

Take for example a hotel that installs a system to allow guests to hear outdoors, perhaps to hear the ocean. Each window can have an ACD device, each room can have an ADD that when powered on, causes the ACD to power on. Additionally, the hotel main office would have the ability to power on or off any specific outdoor window or hear sounds from outdoors from all windows, or a side of the building, and so on.

Consider a crowd of people listening to a person speaking at a central podium—typically, the person speaking is broadcast out through multiple speakers from a single microphone or a small set of microphones.

Alternatively, imagine the advantages and benefits if everyone in the crowd had a microphone and a remote observer could listen to the person speaking from the location of any specific person in the crowd, or group of people, or all of the microphones from all the people in the crowd simultaneously. Also, imagine if one could not only hear how the person speaking sounds from many locations, but it could provide direct feedback about what people in the crowd are saying about information being presented. Accordingly, an improved system would be a very valuable tool for real time monitoring of the feelings and reactions of a crowd.

Such an improved system does not currently exist that allows this type of scaling and/or distribution with the ability to control any one or all the input devices.

3. Lack of configurability

While there are many modular systems on the market today, they are typically limited to a specific functionality and do not provide a large variety of configurations to take advantage of enabling a single Audio Collection Device to expand to unlimited Audio Collection Devices. This creates a problem of needing to buy and understand multiple types of systems based on a desired functionality. This can create added costs for components, training, and usage. In the worst case, the current system may become obsolete if a larger and/or a more capable system is needed in the future or if the need outgrows the current system.

4. Lack of remote Internet connectivity

With the Internet of Things, many devices can report back to a server or a central application. This is typical with such systems like the Blink camera security system from Amazon, Ring doorbell systems, or security systems like ADT.

While these systems are capable for the specific monitoring uses and provide many features, they do not supply configurations and use cases for crowd collaboration nor leveraging the power of connection of large groups with Audio Collection Devices.

5. Other challenges and problems may arise such as, e.g., the Audio Collection Devices may be remotely located where power is not readily available, such as, e.g., where an Audio Collection Device needs to operate 24 hours a day, 7 days a week for a long time without the need for human intervention to change batteries or manage power loss problems.

6. Lack of battery management, monitoring, and recovery control to ensure the device continues to operate versus just letting the batteries to go dead. Power control of such a system needs to be done remotely and wirelessly to avoid needing to go to each of the sites to resolve issues.

7. Lack of audio noise control from power supplies, chargers, and other interference are common problem with the prior systems when using video monitors causing audio to have unwanted noise due to the system being focused on video, or providing an inadequate understanding of a situation versus supplying a CD quality level of audio.

8. Control from a central location managed as a large group of people with a single intention needs to be solved for the ability to have many people collaborate simultaneously and to control such a system efficiently and effectively.

9. Lastly, there are not adequate presentation systems in place to bring together many different media types into a single product or presentation as a whole collection of works simultaneously.

Accordingly, present embodiments aim to solve the problems discussed above and to also solve other problems that are inherent in creating such a system and method as described herewith. These and other issues, solutions and advantages will be addressed and discussed throughout this disclosure.

Some exemplary features of an exemplary system and associated method according to present embodiments may include, but not limited to:

1. audio Input and output devices which are addressable and configurable;

2. ability to plug and play for creating a variety of unique configurations;

3. scalability, supporting a single input device or a stadium full of people;

4. modular building blocks that can be added into an environment, for example, added to a window either through a window upgrade or as part of the window manufacturing process. Alternatively, modules can be mounted directly to a structure or added pleasingly to an enclosure to match a specific environment. Modules may also take the form of a software, such as an app, to be installed on a mobile device or a computing device, such as, e.g., a smart phone, a tablet, a PC, or a server;

5. multi-dimensional audio listening system enabling features for sound output to provide a full sound immersive experience;

6. an audio playback system, e.g., for playing recorded audio directly back to wildlife for the purposes of wildlife reaction and interaction observations;

7. system that can be added to the Internet of Things (IOT) using features and functions such as edge computing to allow access to real time audio, alteration of audio streams, audio analysis, audio storage, and live broadcast as enhanced monitoring;

8. an ability to track a sound source in real time as sound moves through an environment or an eco-system using, e.g., GPS or other location tracking capabilities; and/or 9. analysis of sound providing user feedback about features of and potential causes of a specific sound or sounds.

BRIEF DESCRIPTION OF DRAWINGS

FIG. 3B illustrates an exemplary Audio Collection—PC user interface.

FIG. 5B illustrates an exemplary Cloud Audio Distribution Control.

DETAILED DESCRIPTION

Figure 1A:
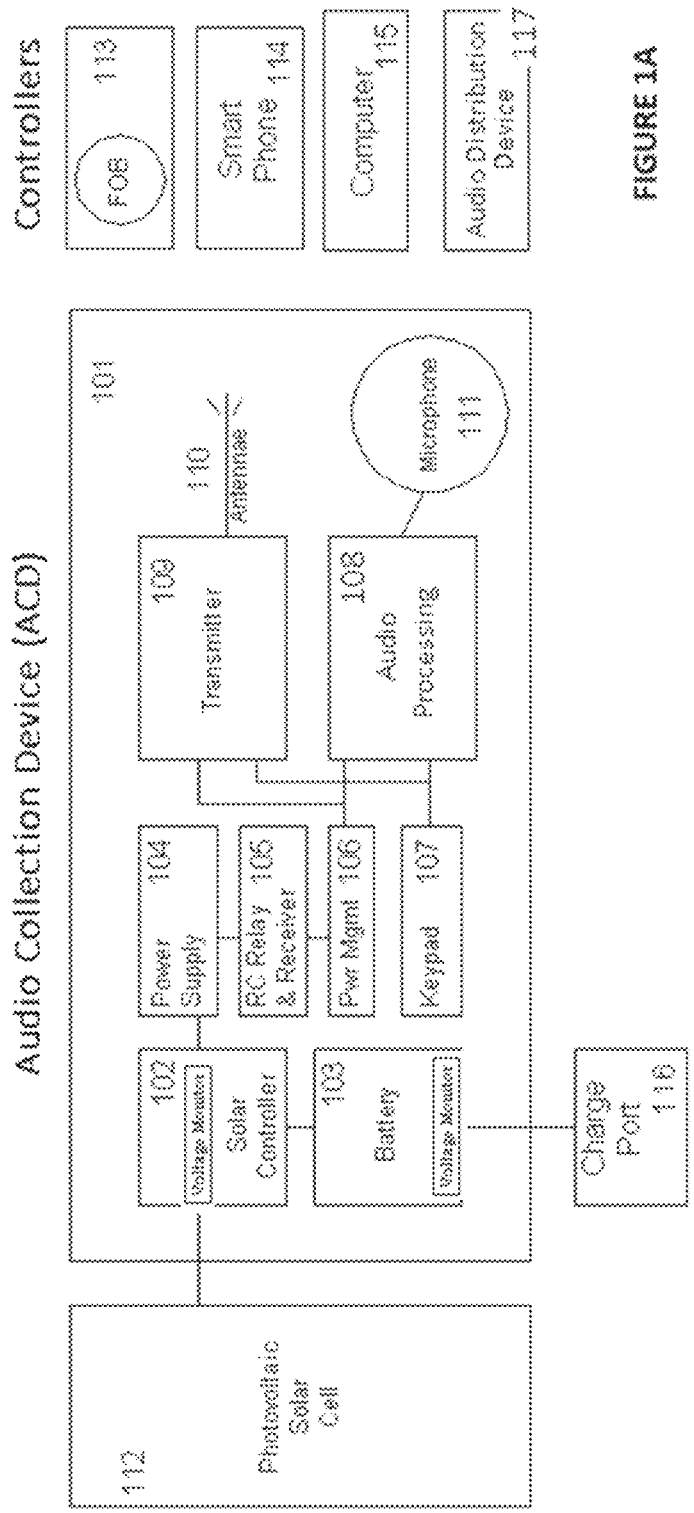
FIG. 1A illustrates an example of an Audio Collection Device (ACD).

Present embodiments in some ways are about creating and presenting informational audio/video, and related content as original works. It involves new types of tools that can be used to accomplish creating original works. The following paragraphs provide examples, related problems, solutions and/or associated advantages.

Consider an artist who observes birds. The artist may listen live or may record the birds using an audio recorder; however, the audio recorder has limitations for battery time, recording medium space, limited audio inputs, and a requirement of timing for when a specific audio condition occurs. Then while watching a specific bird, the artist creates drawings or paintings relative to the bird. Additionally, the artist creates an abstract artwork about the bird's environment along with very high-resolution photographs. And lastly, the artist creates a writing about what was observed or possibly creates a story about the scene.

As can be seen, there are many different aspects about the information being collected with different types of mediums of content being created, including sound recordings, artwork, and a document. Now the content creator has a new challenge, how would the person present the different types of related mediums to the public as a whole package? Moreover, how would the content creator be provided with a more efficient and easier way of making available his/her original works to allowing access by a large number of audience/viewers?

The traditional presentation options available leave the content creator with either splitting up the works or presenting them individually, as would be typical with making available the works as separate art at services like Pintrest, Etsy, Ebay, Amazon, Craig's List, Audible, or perhaps Spotify. Or the content creator could make available the content as a book or an audio book, however, this is not fully compatible for documents or graphics. Another presentation method could be to capture everything in a single video including the sound, artwork, and writings and present the content on YouTube, but that reduces the content to a medium that is inadequate for the quality of the artwork, audio, and writings. Moreover, the content creator would need an extremely large number of viewers to be viable. Similar scenario with Facebook, the content can be created but the medium is inadequate and does not appear to be viable for a multiple-work content creator.

As a final option, the content creator could create a unique website where the person could adequately present all the mediums of the content in a manner that does it justice, however, this requires technical skills or requires the content creator to pay someone else to create the web site, and will have added costs of recurring fees to keep the website maintained and running. As a result, typically, the whole of the content goes unpresented to the public due to the challenges and problems listed above.

As can be seen, there are a variety of problems for a content creator to generate and create a large audio/visual works combined with other relative mediums, and to get a whole body of original works published and presented to public viewers with ease of use, and for a large number of audience/viewers.

Again, present inventor recognizes some of the problems which needed to be solved according to the embodiments presented herewith:
1. Audio Collection Devices to support unlimited audio streaming without needing to be concerned about location, power sources, and adequate audio storage and ease of use;
2. a method to bring separate self-contained Audio Collection Devices into a single stereo or mono audio stream or recording;
3. placement of audio devices where a content creator may not have direct access, for example, on cliffs or roof tops;
4. presentation of full works of original audio content and relative other mediums with ease of use; and/or
5. a presentation system that promotes and enables content creators to present a whole set of created original works, created in different forms, as a single item.

Accordingly, the present disclosure introduces examples of a new type of audio/visual content creation and companion presentation system that incorporates a compensation function for content creators. Provided in the present specification are engineering solutions, technical architectures, descriptions and techniques that combine components, techniques, and computing devices to create a system of modular tools and components comprising:
   Components that make up the Presentation and Compensation System, e.g., may comprise:
      1. New audio content creation and presentation tools
         a. Audio Collection Devices (ACDs)
         b. Audio Distribution Devices (ADDS)
         c. Control Analysis Functions (CAF)
         d. Presentation platform
            i. A web based platform that provides ease of use and includes
               1. Web pages
                  a. Allows original works owners to manage content and compensation
                  b. Provides a method/apparatus to present multiple mediums simultaneously as a single product
                  c. Allows potential customer to search, review, and directly purchase original works
               2. Ecommerce function
                  a. To allow audio and other content to be sold
               3. Database
                  a. To house content, owner metadata, customer metadata, and ecommerce information The modular components of the Audio Collection System and Presentation Platform are further described herewith:
Audio Collection Devices (ACD)
Components/Features Exemplary Audio Collection Devices (ACDs) for collecting/capturing sound distributed in one or more locations may comprise several components/functional blocks such as, e.g., a power supply, a microphone for input, a transmitter and an antenna for audio output, device controls, and an addressing id/feature to make the device unique from other ACDs on the system. FIG. 1A provides an exemplary block diagram of an ACD (101).

Referring to FIG. 1A, the ACD (101) has several functional blocks. This version of the Audio Collection Device (101) does not rely on AC power but instead can be placed outside and powered by the sun via a photovoltaic cell (112) that recharges a battery (103) via a solar controller (102) that prevents the battery from over charging. Solar charging system technology is well understood to a person skilled in the art and will not be explained here in detail for purpose of brevity. The power supply function (104) may be part of the solar controller (102) or power may be supplied directly from the battery (103).

There is a Remote-Control (RC) Relay (105) added to provide the ability to remove the load from the system when the input device is not in use, avoiding unnecessary current drain on the battery (103).

The RC relay (105) may be controlled by any remote-control option, for example, a remote key FOB (113) using a wireless signal, a Smart Phone App (114) via a cell phone network or the Internet, a computer (115) via a WiFi network, or other devices that use wireless communication protocols like Bluetooth, ZigBee or Zwave that are common in commercial, home automation, and security systems. The remote control FOB functionality (113) may also be included in an ADD receiver device (117) so that, when the ADD receiver (117) is switched on, the ACD (101) is also switched on via the RC relay (105), thru a signal sent from a wireless transmitter in ADD (not shown).

However, there is some voltage drain expected when the RC relay (105) removes power due to the RC Relay receiver circuit (105), therefore, during storage the battery may be physically disconnected or by using a physical switch (102).

Following the RC Relay (105) is a power management circuit function (106). This circuit monitors battery voltage and during a low voltage condition, the load is disconnected to avoid a deep discharge of the battery (103). Once the battery is recharged by the solar cell (112), the power management circuit (106) will reconnect the load to the battery (103).

The load for this Audio Collection Device (101) includes a microphone (111), an audio processing function/processor (108) that provides audio amplification, mono or stereo selection, and/or power for an active microphone 111. The audio processing function/processor (108) is connected to a transmitter (109) that has a unique address entered via a keyboard (107) or is software configurable to allow this ACD (101) to be distinguished from all other ACDs in the system. The transmitter (109), connected to an antenna (110), may be any number of options, for example, Bluetooth, FM, AM, WiFi, ZigBee, cell service, or other unique wireless protocol using, e.g., RF 2.4 GHz or 933 MHz, or any other suitable frequency or frequencies. The processor (108) may also provide other controller and coordination functions for the rest of components of the ACD (101) as is well known in the art.

If the device (101) is used indoors then the solar cell (112) is replaced with an AC to DC power supply (not shown in FIG. 1A). Optionally, battery (103) and the solar controller (102) may be removed or left in, if battery backup is desired.

Other features may include indicators, such as, for example, voltage and amperage indicators, running hours, charge hours, sunlight hours, temperature, humidity, and sound meter (VU) and a charge port for battery recharging (e.g., 116). Additionally, options to control and report status of the ACD may include the following components:

One or more microprocessor/microcontroller for the purpose of:
  a. Indicating voltage levels for solar cell (112) and battery (103) reported to a user verbally with a synthetic voice, for example, when the unit (101) first powers up, an audio voice signal is sent saying "battery voltage is 6.2 volts, solar cell voltage is 12.4 volts" via the audio transmitter (109).
  b. Automatic actions using a microprocessor/microcontroller with monitoring of voltage, time, or environment:
    i. Providing automatic shutdown or sleep mode if battery level is low.
    ii. Automatically comes out of sleep mode when a battery voltage reaches an acceptable or full voltage level.
    iii. Timer actions to go into sleep mode or full power-on mode based on time.
    iv. Night versus daytime operations, changing the transmitter power output or frequency determined by available light from the sun.
    v. Temperature, actions taken based on temperature to either enter a sleep mode or a full power mode.

The microprocessor/microcontroller may also be used to packetize data to transmit the audio via a wireless network. One example of a microprocessor/microcontroller suitable for use in the present embodiments may be an ST32 series SoC (System on Chip) processor component from STMicroelectronics. STMicroelectronics provides standard (ARM based) performance and cost effectiveness microprocessors/microcontrollers with good product life cycle that is programmable using C/C++ and a development environment with some features including standard SDK STMicroelectronics libraries and SoC IC radio. Alternatively, the SoC IC may connect to a separate radio component.

Exemplary source codes for a microprocessor/microcontroller suitable for implementation of present embodiments may include some or all of following software functions/features:
  a. Boot code to load a main program loop that includes:
    i. Voltage monitor and solar charging
    ii. Sleep mode until the battery is adequately charged
    iii. Receive audio from microphone(s) connected to an analog to digital converter
    iv. Packetize digital audio into a WAV, MP3, OGG, or another digital audio format
    v. Transmit the packetized audio to a receiver ADD via a wireless network protocol
    vi. Keep alive timer to reset the device if a problem is encountered
    vii. Addressing for the device
    viii. Volume output control and/or audio gain control
    ix. Audio normalization
    x. Filtering of audio signals to remove unwanted frequencies An exemplary battery charge circuit (116) suitable for implementation of present embodiments may be a Texas Instruments charge controller such as UC2909-EP, or the like.

An exemplary battery (103) suitable for implementation of present embodiments may be a sealed lead acid 6V battery which has been a proven solution fora wide range of environmental conditions, as proven out with vehicle over the last 50 years, however, other options are available.

In addition, two active omnidirectional microphones (111) may produce stereo monitoring.

These above are all typical examples of components that a person skilled in the art would recognize and may be used in implementations of present embodiments, however, these examples are not intended to be limiting, as other options may be selected, such as, using lithium ion batteries (103), different charge controllers (e.g., a Texas Instruments BQ24765 component), and audio filtering could be done with hardware components versus microprocessor/microcontroller software.

Therefore, some advantages and features of an exemplary Audio Collection Device (ACD) according to present embodiments are that it solves the problems of:
  Needing a wire through a window.
  Scalability:
    Each ACD is addressed and contains its own power source.
  Each ACD has a unique id and control:
    Switch on/off audio and transmitter circuits Adjust each unit's features like volume, stereo selection, gain boost, and power management separately from remote, central or distributed location ACDs can be located at any place a radio signal may be received and transmitted.

ACDs are modular and may be brought together to make larger systems.

ACDs are programmable and may include filtering to improve the audio signal.

ACD Physical Characteristics/Features

Audio Collection Devices may be standardized size modules allowing them to be housed or installed into many types of enclosures, for example, a bird house, integrated into or onto a window, a flower box, a lamp post, ruggedized plastic or metal boxes, wall AC wiring outlet boxes, or vehicle installations.

In some exemplary embodiments, Audio Collection Devices (ACDs) may not need to be newly designed and developed hardware, and instead, may be implemented by software such as an app on a mobile/computing device. For example, the app may be software developed to run on existing hardware (e.g., standard smart phones, tablet PC's, or smart walkie talkie, etc.) may be another way to achieve similar results. In the case of a smart phone, an app using the embedded components of a smartphone could supply the functions and features of an Audio Collection Device. This would allow a few, a group, or a stadium of smart phones to be used in new ways to create a larger system for audio data collection and analysis, according to the present embodiments.

Audio Collection App as an Audio Collection Device

Figure 2:
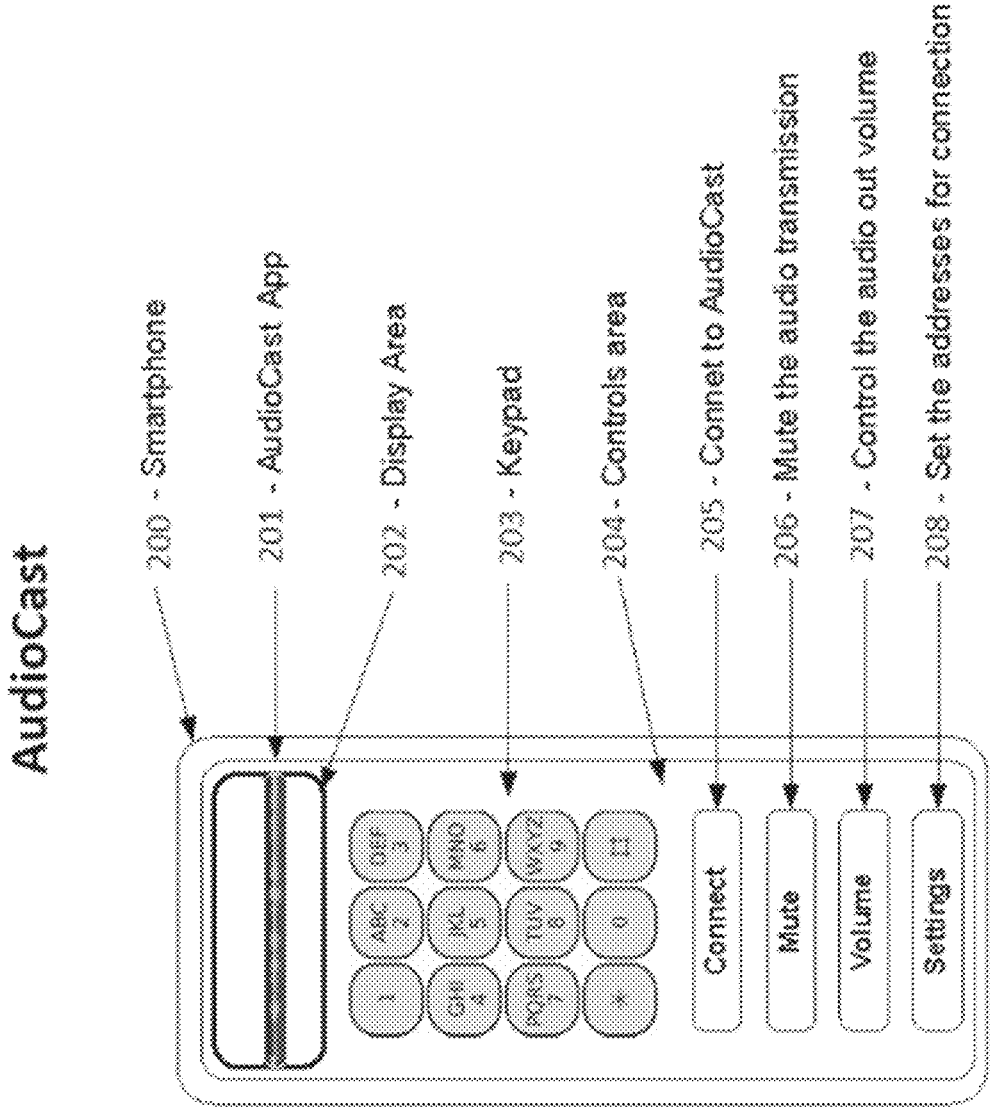
FIG. 2 illustrates another example of an Audio Collection Device (ACD) using an app.

Referring to FIG. 2, an Audio Collection App is an example of software that may be installed on a tablet, smart phone, or a PC. The Audio Collection Device App (e.g., "AudioCast App" 201) allows an audio stream to be sent to an exemplary Audio Collection System (see, e.g., 310, 314 in FIG. 3A, to be described in more detail below) for listening, processing, datamining, and if desired, remote control of the Audio Collection Device App (201) itself.

The Audio Collection Device App (201) may be configured directly at a smart phone (200) or over a network using software from another location connecting to the phone (200) via an IP address, mac address, phone number, and/or other smart phone addressing means. Features for the Audio Collection Device app (201) could be many, but referring to FIG. 2, some of the features and components are additionally described below:

1. Smart phone (200)—comprises a processor, memory, microphone, A/D function, network connection, power source, touch screen display.
2. AudioCast App (201)—Audio Collection Device app/software for the smart phone.
3. Display area (202)—For displaying control and status information.
4. Keypad (203)—For entering and controlling the app (201).
5. Controls area (204)—Having physical or virtual buttons for selecting features and settings.
6. Connect button (205)—Physical or virtual button used to connect to/from the Audio Collection System.
7. Mute button (206)—Physical or virtual button used to mute the audio output from the Audio Collection Device.
8. Volume (207)—Physical or virtual button used to control the level of the audio output from the ACD.
9. Settings button (208)—Physical or virtual button used to launch a configuration screen for keyboard input. For assigning send/receive communications addressing.

Setting transmit audio quality, microphone boost, and save settings.

Accordingly, one exemplary use of an Audio Collection Device is during real time broadcasting. For example, imagine a concert where most people in the audience has a smartphone and the Audio Collection App (e.g., "AudioCast App" 201) is installed on each phone and setup with Audio Collection Device feature enabled. People in the audience can therefore connect their individual Audio Collection App 201 with the Audio Collection Service (400, 404 in FIG. 4) via a communication connection with the internet, using, e.g., cell service, Wi-Fi network, or other available connection option.

Figure 4:
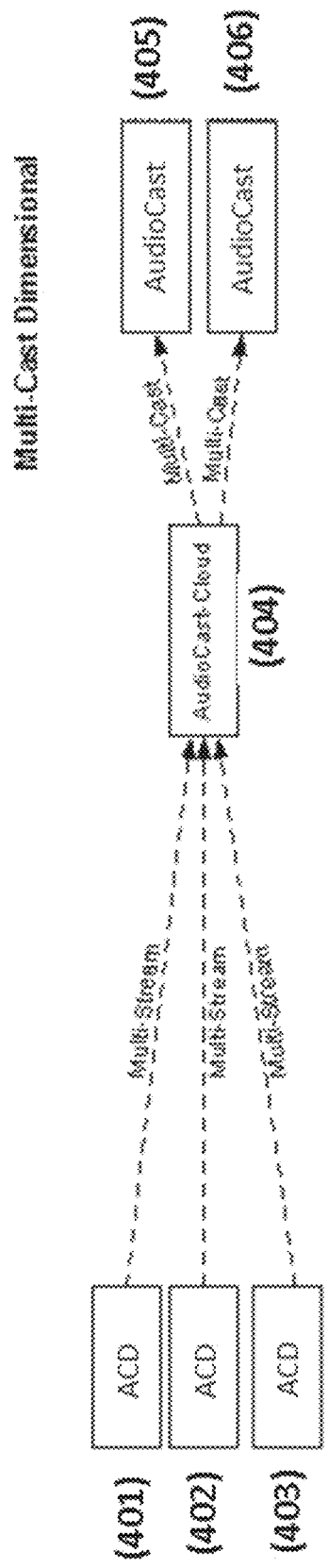
FIG. 4 illustrates an exemplary Server Software, Cloud Control and Analysis System (CAS).

As shown in FIG. 4, an exemplary Audio Collection Service (400, 404) processes each audio received from a respective Audio Collection App (401-403) and makes the received audio available as a broadcast over the internet to users or subscribers of, e.g., Audiocast App (405, 406). In addition, the Audiocast Service (400, 404) may provide various options for broadcast output, for example, a stereo broadcast with all phone apps to one side of the stadium, and the alternate side of the stadium phone apps out as the other side of a stereo channel. Or a mono broadcast for playback would be another example. Still another example may be to mute phone apps from output due to noise, distortion, or other audio problem. Because present embodiments allow addressing and control of each Audio Collection Device, many processing, control and output options may be made available and/or may be automated to address noise or distortion problems in real time. Additionally the AudioCast App may include a receive ADD option to listen to the broadcast of a collection of ACD's.

Analysis on the audio sound may be managed at any stage of the system. For example, an audio input may be normalized at the Audio Collection Device phone app 401, or at the Audio Collection System (see, e.g., FIGS. 3A and 3B). Other functions may be implemented such as, e.g., synchronization, echo, delay, multiplexing, normalizing, compression, format change, and automatic editing, however, one skilled in the art would readily recognize that many features applicable to audio processing may also be applied to such a system.

Another exemplary use according to present embodiments may be monitoring of a fireman during fighting of a fire or enabling monitoring in ad hoc way for an unexpected situation. One skilled in the art would recognize that such a system may apply to many different types of situations based on present exemplary embodiments and principles presented herewith.

One skilled in the art of creating a smart phone app (e.g., Android smart phone app) would realize that there are many sample source codes available from Internet repositories like Gethub and Stack Overflow. Such sample source codes may be modified according to present embodiments and teachings to create an ACD app with the features of recording and broadcasting audio via a smart phone using the Android Software Development Kit (SDK). Similar app may be implemented for, e.g., Apple IOS mobile devices.

As an example and illustration, an exemplary ACD smart phone app may be implemented via the exemplary source code listing as shown in Exemplary Source Code Listing and Overview section at the end of this disclosure.

Audio Distribution Devices (ADD)

According to present embodiments, one or more Audio Distribution Devices (ADDs) may be employed for distributing sound collected by one or more ACDs, to one or more respective locations of the ADDs.

Audio Distribution via a Radio Receiver as an ADD

An Audio Distribution system configurations according to present embodiments may be in many different forms depending on the application needs. For a smaller system with 1 ACD and 1 ADD, a portable FM radio may be an option for audio distribution as the ADD, understanding that certain control and statistical features are not available as with more robust options such as with an Audio Collection-PC option (FIGS. 3A, 3B) or Audio Collection-Cloud option (FIG. 4) described in further detail herewith. Higher quality radio with features such as, e.g., stereo, HD sound, surround sound, and quality speakers may be used to make the audio collection sound more realistic.

Matched pair ACD and ADD

Another example may be to use an Audio Collection Device with a "matched" Audio Distribution Device using, e.g., 2.4 GHz RF packetize networking. In this exemplary configuration, the Audio Collection Device may contain a microcontroller, a 2.4 GHz Transmitter, microphone pair for observation, a MCU for solar charging, direct charging jack for system for when solar is weak or not available, two volt meters to provide indication of battery and solar voltages. The voltage indication allows the user to position the ACD for best solar collection.

Figure 1B:
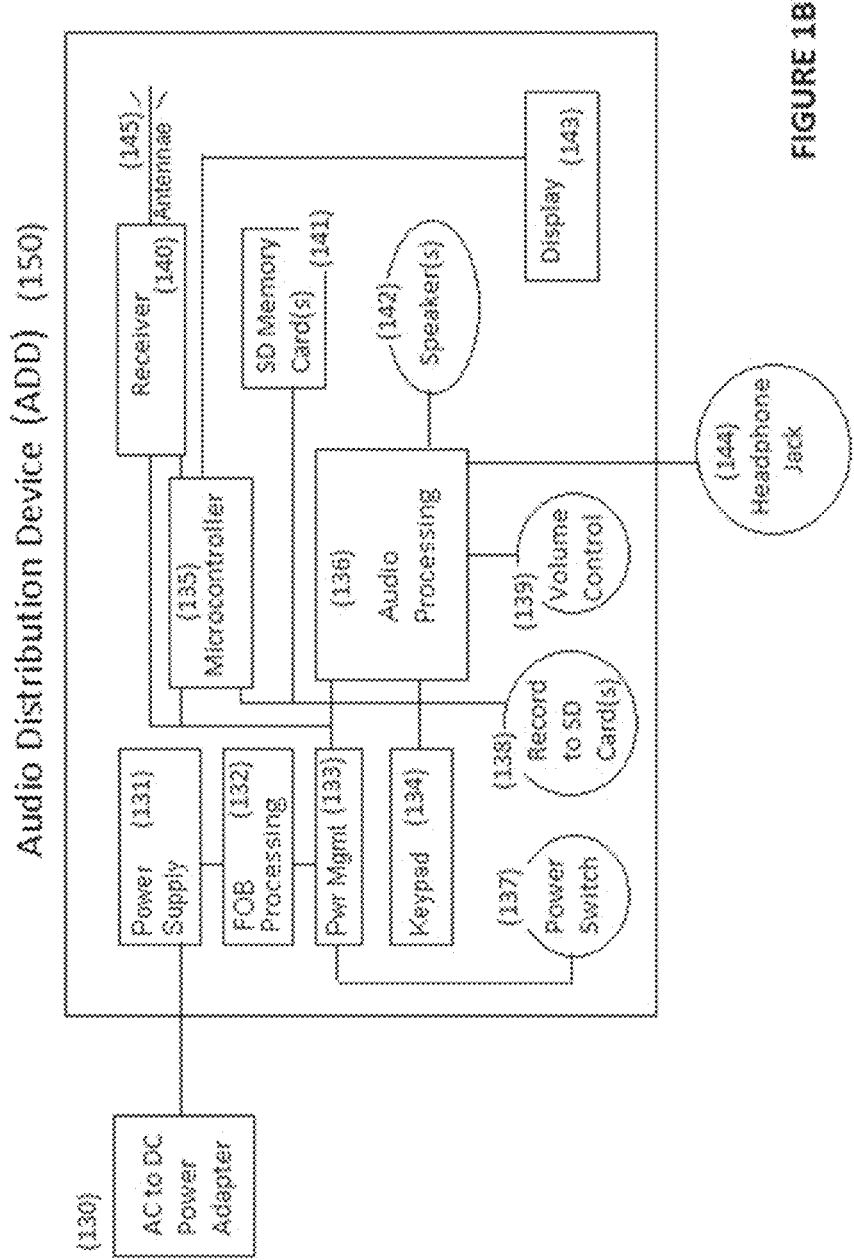
FIG. 1B illustrates an example of an Audio Distribution Device (ADD).

Accordingly, referring to FIG. 1B, an Audio Distribution Device (150) may include a build-in FOB (ON/OFF) controller (132) that operates when the receiver ADD (150) is powered on/off by a power switch (137), by creating a signal that would power on/off a respective ACD transmitter device (not shown), eliminating the need for a separate FOB, and to provide synchronization of the power status of the paired ACD/ADD. The ADD (150) may also contain a volume control (139) on the ADD receiver (150), DC power supply (130) with optional battery (not shown) included within the case of the ADD, 2.4 GHz network receiver (140), audio headphones output jack (144), and a speaker output system (136, 142).

In one exemplary embodiment, the same components used on the ACD may also be used with the ADD with the exception of a receiver function (versus a transmitter) and an AC power input jack. For operations, the ADD may us a solar cell and include the same solar charge controller as the previous ACD description.

The ADD may also store audio files from an ACD onto an SD memory card (141), or a set of multiple SD cards (141), for longer or daily storage requirements. The audio files stored on the SD memory card (141) can be stored as individual hourly files or other amount of time duration (e.g., 1 file equals 1 day of audio collection) to allow easy management of the audio files. The ADD (150) may also include a keypad (134) and a display (143) to configure addressing and display other options for selection of, for example, audio quality stored and file duration selections. The features of SD storage, FOB function, and audio features selections could also apply to an FM ADD receiver, as mentioned above.

As with the ACD, the source code for the ADD may include a main loop with functions for: a) volume, b) converting the packetized network audio payload into an audio format for output to a speaker or c) writing audio to an SD card (e.g., in WAV, MP3, or OGG format), d) device addressing, e) Audio Gain Control (ACG), f) normalization, g) mono/stereo, h) LED lights for status for power on, i) RF signal, j) output status display, and k) keyboard input for control, and etc.

Audio Collection-PC System

Figure 3A:
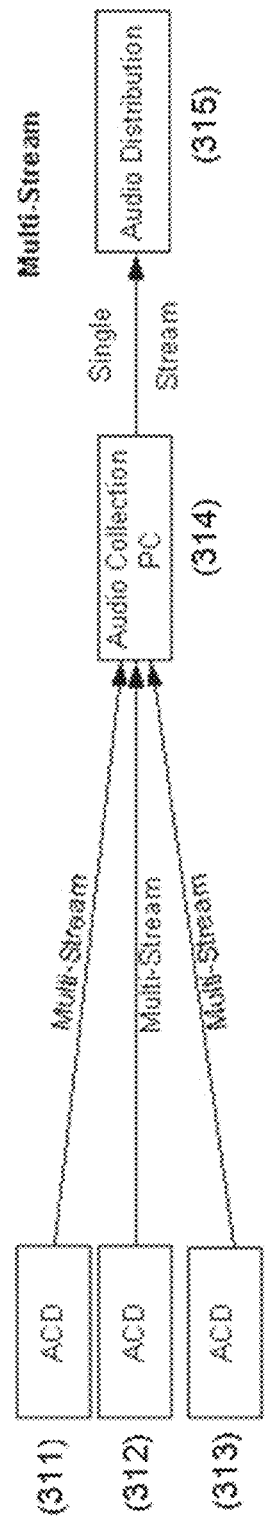
FIG. 3A illustrates an exemplary Audio Collection—PC configuration.

FIG. 3A illustrates an Audio Collection-PC configuration example, and FIG. 3B illustrates an Audio Collection-PC user interface functionality screenshot. FIGS. 3A and 3B provide an example a larger (mid-tier) system (310) according to a present embodiment, with a plurality of ACDs (311-313) providing audio inputs, a computer (314) with a wireless network connection, mass storage device, speakers, keyboard, mouse, and display, executing Audio Collection-PC software provides the ability to manage several ACDs (311-313) simultaneously.

In addition, exemplary software for a PC based system as shown in FIGS. 3A and 3B may optionally include a sound mixer function (323, 326), multiple ACD input tracks (322), time controls, and file saving (329, 330, 331) to mass storage which may include, e.g., disk drives, memory, digital tape, network drive, cloud storage, and etc. Other features of the software may optionally include speaker output controls, sound effects control, post processing abilities for statistical analysis for items such as, e.g., audio or sound events, audio editing, and audio format conversions.

Audio Control and Analysis System/Function (CAS) Using an Audio Collection-Cloud System FIG. 4 illustrates an exemplary Audio Collection-Cloud system 400 for servicing very large-scale systems. According to this embodiment, the Audio Collection software may be scaled up to run on server(s) with, e.g., high capacity processor(s), RAM memory, RAID configurations with solid state disk, high speed network trunks, backbones, databases, and/or running Audio Collection-Cloud software. In this configuration, a channel is open to each ACD (401-403) initiated and connected by either the Audio Collection-Cloud service (404) or by the ACD (401-403). Once connected, the ACD's audio is streamed into server(s) (404) and time synchronized with all other ACD's/channels.

Using other Audio Collection-Cloud software features, the audio streams may be combined, separated, sound levels adjusted, and searched for predefined trigger points to result in other actions taken. Other features may include enabling/disabling a specific channel, sending a text note to an ACD display, receiving a text note from an ACD, retrieving other items from an ACD, such as temperature measurement, a GPS/WiFi/cell location, humidity, ACD volume level, run time, sunlight time or other environmental readings, battery status, power usage, and battery charging status, and etc.

Other useful features may be added, such as, e.g., in the situation in which many people in a stadium with their smart phones set to Audio Collection. For example, a count of the total ACDs in used/enabled, relative location of ACDs, and management of the ACDs, as a system may be achieved. In one exemplary implementation, ACDs near a stage may be set to have lower volume levels and ACDs at the back of the stadium set to have high volume levels. In another exemplary implementation, software may collect audio streams by switching through ACDs in real time to create a sound immersive effect when listening through headphones. In yet another exemplary implementation, channels may be transmitted to other rooms or halls with many output speakers providing a sound immersive effect of being in the stadium.

One skilled in the art will readily realize that there are many unique output configurations that may be created using such a modular building block in an Audio Collection System approach, according to the present embodiments.

Figure 5A:
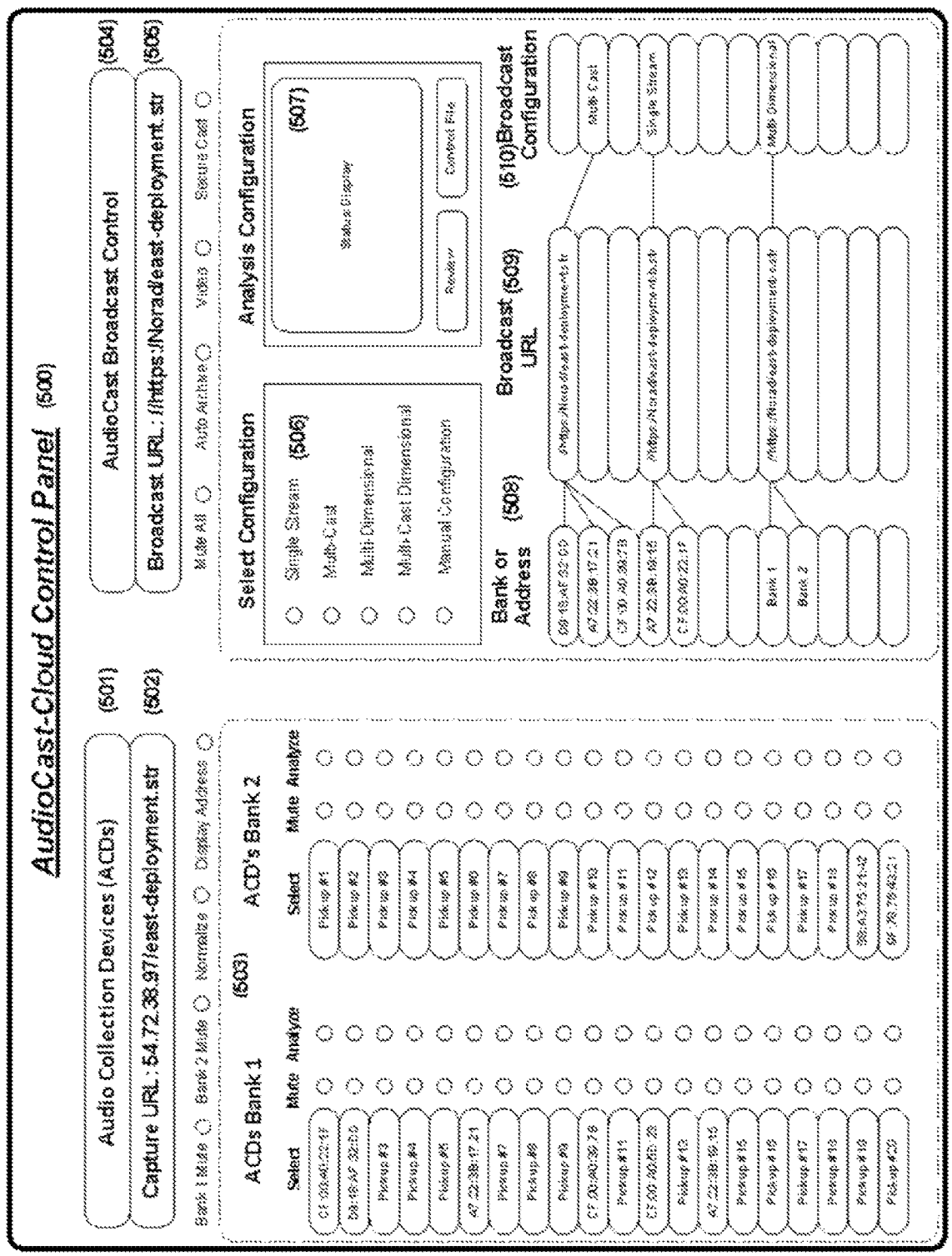
FIG. 5A illustrates an exemplary Cloud User Control and Configuration.

FIGS. 5A and 5B illustrate other aspects of an AudioCast cloud based Audio Collection and Distribution system and method. They show exemplary configuration control screens and features for a user display for an Audio Collection Cloud, also called AudioCast-Cloud (500), the left side of the display (501) reflects audio connections (503) coming in from Audio Collection Devices via addressing. ACDs may connect to a capture URL (502). The right side of the display illustrates a connection mapping AudioCast Broadcast Control (504) mapping ACDs to stream configuration options (e.g., Single Stream, Multi-Cast, or Multi-Dimensional). People that want to listen (listeners) (521) to a broadcast may connect to one of the URLs provided (522).

Referring again to FIG. 5A, if any ACD Control (503) or broadcaster path is double clicked (508), (509), and (510), another screen is displayed with selectable features for that specific device or configuration, including sending and receiving text messages, manual or automatic ACD addressing, manual or automatic connecting, displays for GPS location(s), temperature, time, volume control, device user information, proximity, device type, and device related information (e.g., hours of sunlight, runtime hours, battery status, and etc.).

Selecting any of the "Analyze" radial checkboxes (503) will cause logging to be captured for a specific ACD, tracking items like sound event counts, or other items, such as, e.g., location, temperature, time, volume control, device user information, proximity, device type, or other device related information (e.g., hours of sunlight, runtime hours, battery status, and etc.).

Reviewing the analysis information may be done using the analysis controls (507) wherein the display indicates the current status. The "Review" button opens a window displaying details of the analysis and provides an option to export the data in, e.g., a csv format for input into a spreadsheet or database. The "Control File" button on the analysis control (507) allows loading of ACD parameters for automating the collection analysis process. Events to be analyzed may be, e.g., predefined using a control file.

FIG. 5B illustrates another exemplary control screen for choosing specific configurations for, e.g. Single Stream, multicast, and manual, another other control functions/features.

Other Aspects of Audio Collection System

Audio Collection Configurations

The environment being monitored determines the Audio Collection System configuration and if a single or multiple Audio Collection Devices are required to create virtual aspects of the monitored environment. Each Audio Collection Device will broadcast a single stream and/or multiple ACDs may be used to create various configurations for a given environment. To have the full effect of representing a specific environment, e.g., outside of a residence, multiple Audio Collection Devices and AudioCast Receiver Modules can provide a more realistic listening experience. For example, an Audio Collection Device and a Receiver at each window would provide an outdoor sound immersive experience in a room with multiple windows, and is configurable separately, as a group or subgroups.

As a reference point, consider a home security system with multiple cameras and multiple microphones. Using this example to bring outdoor sound indoors would be cumbersome and have extra costs and management due to the additional cameras. Other deficiencies of such a system include sound output options are typically coupled tightly to the video and not designed for quality audio output. Security cameras are not intended or designed to bring audio together from multiple sources to be listened to simultaneously as a full representation of sounds in an environment. Moreover, one would get the hardware setup supplied with the product, and therefore, no selections on microphones, power options, and features to stream only audio. Accordingly, present embodiments of an Audio Collection System being described herewith has many options available to solve these problems and to create configurations for unique environments, which are not found in existing security systems.

Collection System Configurations

Figure 6:
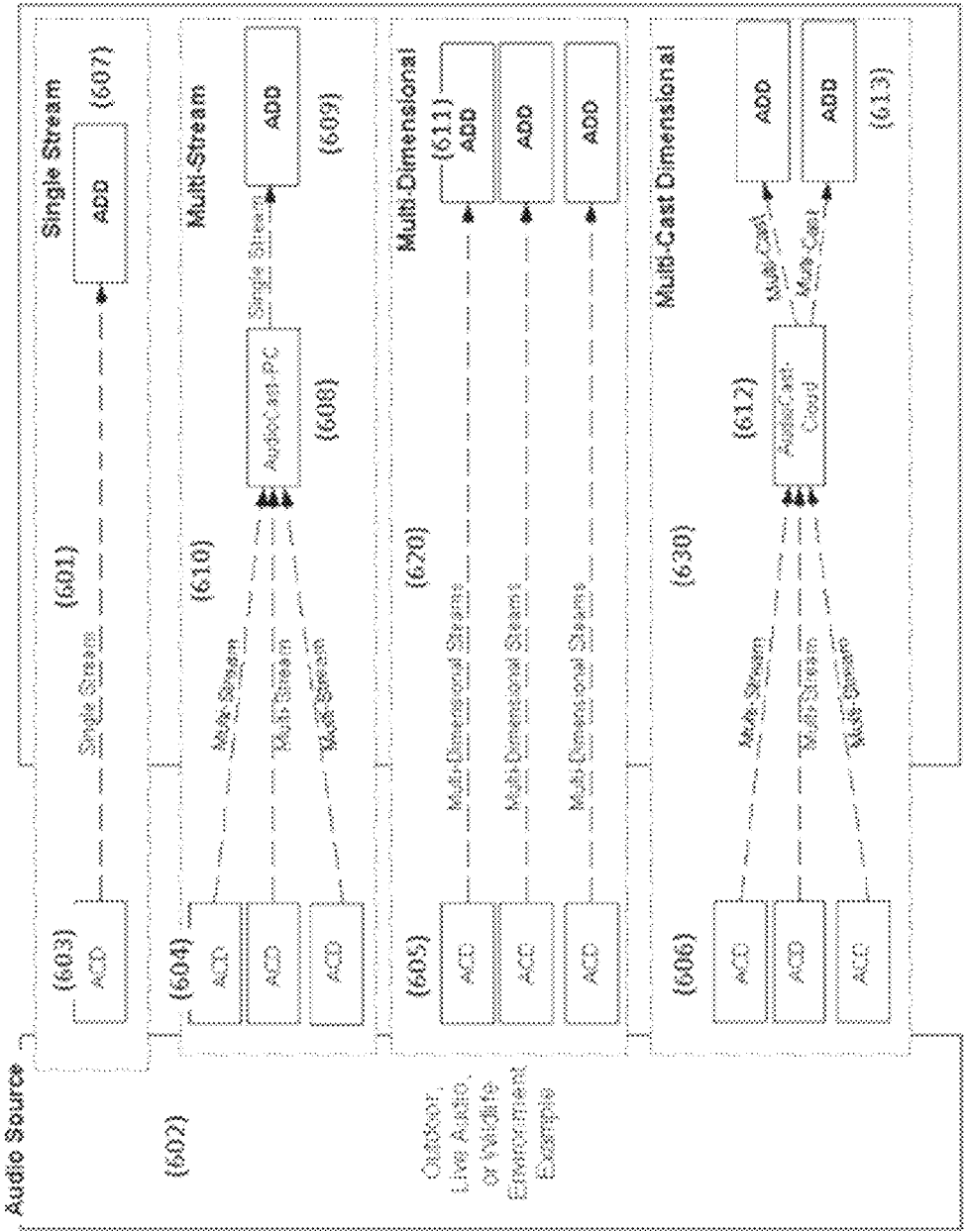
FIG. 6 illustrates exemplary System Configurations.

While many configurations may be achieved, listed here are four exemplary system designs including:
  a) Single Stream
  b) Multi-Cast
  c) Multi-Dimensional
  d) Multi-Cast Dimensional
  e) Other configurations Referring to FIG. 6, the various exemplary configurations are explained in additional detail herewith:
  a) Single Stream System (601)

A Single Stream system (601) collects audio from a local area and broadcast it out as a single audio stream. A Single Stream Configuration includes a single ACD (603) and an ADD (607) for streaming live audio from outside to indoors. This entry level configuration may be used independently or as part of a building block for larger configurations. For example, a window designed ACD with a faceplate to match the design of a window could be an enhancement that window manufacturers could offer as an option. On the inside of the window, an area to insert an ADD, with faceplate to match the window interior.

b) Multi-Stream System (610)

A Multi-Stream system (610) uses multiple Audio Collection Devices and a single Distribution Device. Next level up from the Single Stream, this configuration focuses on multiple areas to be monitored, for example, near different bird feeders in rural backyard areas. All ACD streams (604) are combined to a single audio stream and played simultaneously to a single ADD (609). Control options on a smart phone app or personal computer may be used to control audio stream(s).

c) Multi-Dimensional System (620)

The Multi-Dimensional system (620) focuses on a plurality of ACDs (605) in multiple areas and separation of ADDs (611) to provide a realistic listening experience. For example, an ADD could be located at each window in a home and associated with a respective ACD outside the window. Alternatively, multiple ADDs (611) may be used in a single room associated with multiple ACDs (605) around a garden area providing a listening experience of standing in the middle of the garden.

Enclosures that match the environment may be used, for example, a stone, a plastic frog, or a seat to house the standard form factor waterproof ACD modules. This could be an enhancement that manufacturers for garden accessories may offer as an option.

Being a modular system, the Multi-Dimensional system provides a path for people with Single Stream configurations to expand into.

d) Multi-Cast Dimensional System (630)

The Multi-Cast Dimensional system (630) configuration includes several ACDs (606) with their audio streams combined to a fewer number of ADDs (613). This configuration could be used to monitor front yard and back yard areas of a home with two ADDs in a single room. This would provide the effect of listening while standing in the middle of the yard for example.

e) Other Configurations

It should be noted that other configurations are possible, for example, a single Audio Collection Device to multiple Audio Distribution Devices to bring outdoor listening to multiple rooms or star configuration for ACDs or ADDs.

Accordingly, present exemplary configuration embodiments outlined herewith are used to explain the building blocks of various AudioCast systems. One skilled in the art would recognize that other configurations are possible, therefore, these configurations are not to imply limitations but are used to illustrate scalability of the building blocks as a system.

Audio Collection-IS (Internet Streaming) System

In today's environment, people want everything available on their handheld device like a tablet or a phone. The present exemplary AudioCast systems add extra advantages opening up audio sources to users that want to listen at work, in a vehicle, or other remote locations. Moreover, Internet Streaming opens up utilizing other devices such as Roku, Amazon Fire, and Audible service, or the like.

An exemplary Audio Collection-IS system may comprise a hub type of device that contains an operating system, a network connection, related device drivers, audio input port, and an audio streaming server application (software). The Audio Collection-IS may be implemented as a stand-alone device or optionally may comprise software installed on a personal computer or a micro PC (e.g., a Raspberry Pie computer).

The Audio Collection-IS may contain several controls to allow setup of a broadcast address to be reached by an Audio Collection App to a broadcast service that is always running on an operating system to network addressed ports for the purpose of sending out broadcast packets of an audio stream from ACD(s). Controls may also include setup and configuration of the Audio Collection-IS device itself. In addition, controls may be accessible via webpages that may be accessed from a PC, a tablet, or a smartphone, or alternatively may be done via a local console port or remotely via a utility like PuTTY.

Audio Collection Storage Web Site—Audio Analysis and Storage Services

According to aspects of present embodiments, as audio is collected, a web site to host audio files and other types of files like video, pictures, text writings, drawings, artwork, and so on would be beneficial to allow other users to enjoy, review, discuss, and purchase the original works created by individual users. The web site may also provide analysis and statistics. An Audio Collection Storage web site provides users a central place for file storage. Additionally, products and tools may be available on the web site allowing users to be more productive. Some examples include sound analysis, sound event counters, virtual sound tracking, editing software for editing audio files, images, and videos. Products available from the web site may also include ACDs, ADDs and accessories like mounting brackets, enclosures and so on. Users may also have accounts and control of their uploaded audio files and related contents such as, e.g., video files, documents, photographs, drawings, artwork, and etc.

Figure 14:
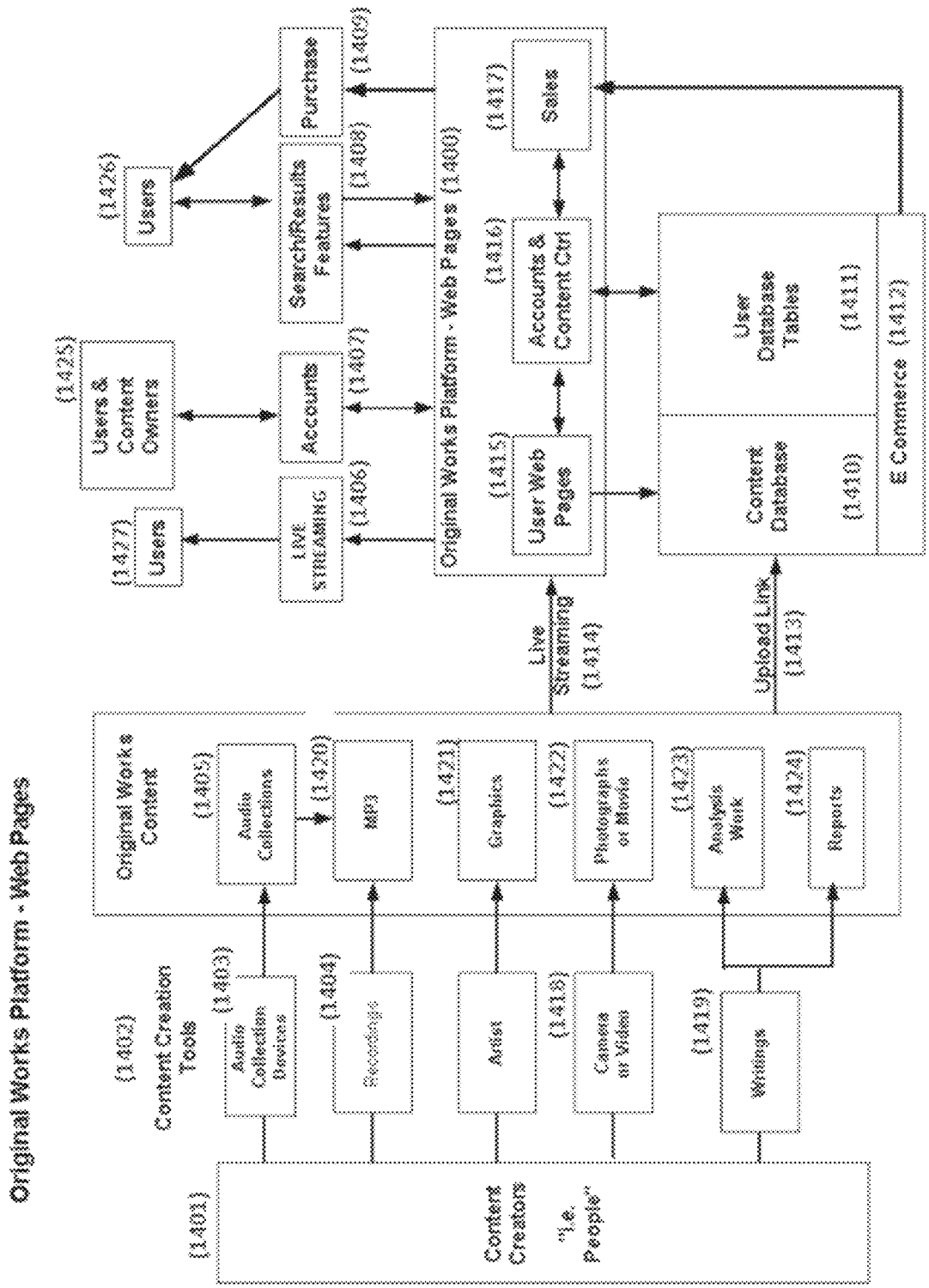
FIG. 14 illustrates exemplary functional components of an audio collection storage/presentation web site.

FIG. 14 illustrates major functional components of an exemplary Audio Collection storage web site according to aspects of present embodiments. Content creators (1401) create content of audio (1403, 1404, 1405, 1420) (from components and systems described) and store that content on the exemplary Audio Collection storage web site as "original works" content. The original works content may also include other types of mediums including graphics (1421), photographs, movies (1418, 1422), and other documents (1423, 1424).

The content may be stored in a database (1410) as a binary large object (BLOB) or other database object type. A web site (1400) is linked to the database and provides user functions for content creators and customers including live streaming (1406, 1427), account controls (1407), content search features (1408) and an ecommerce function for purchase of content (1412, 1417, and 1409).

Audio/Sound Analysis and Control

According to other aspects of present embodiments, sound analysis may be done using a sample of noise or sound and then conducting an analysis of the audio stream to identify if such a noise occurs or has occurred (for post processing). For example, a noise of a bearing failure could be identified in a mechanical device.

A service may be provided by using AudioCast Audio Collection Devices and/or a smart phone app to listen while an engine is running, for example. The collected sound is then streamed to a service/server wherein the noise from the engine is analyzed using sound comparison function (e.g., via a Hidden Markov Model or artificial intelligence analysis) comparing the input sound with a library of known sound models. A response is provided back to a user with possible causes of the noise. If the noise is unknown, then the user is requested to input what issue was discovered for the purpose of updating the sound and/or problem identification library.

Figure 7:
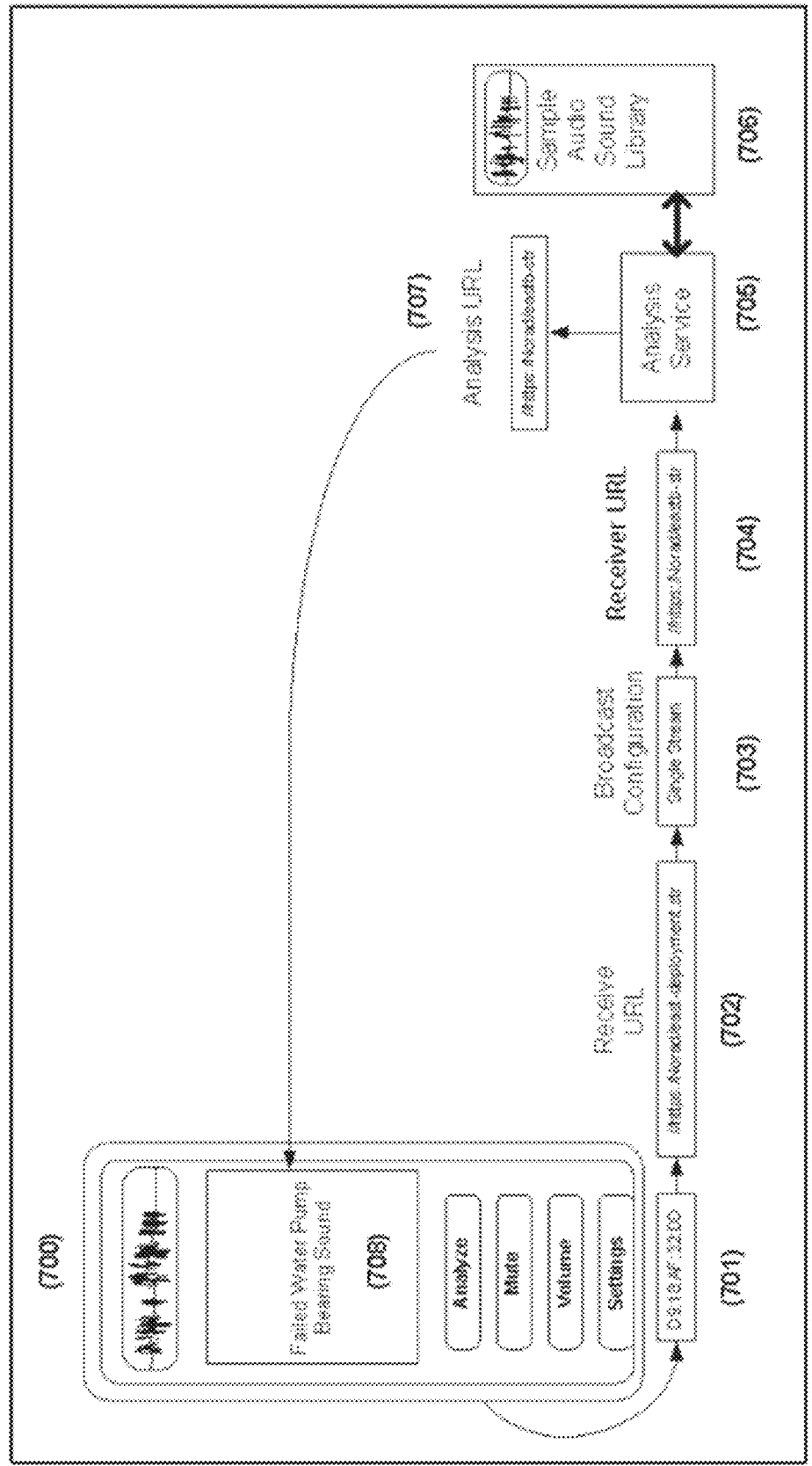
FIG. 7 illustrates an exemplary Audio Collection Device, Sound Analysis System.

FIG. 7 illustrates exemplary sound analysis features with an Audio Collection app such as an AudioCast app installed on a mobile device (700), as previously mentioned and described. The exemplary AudioCast app (700) may comprise 4 exemplary virtual buttons including, Analyze, Mute, Volume, and Settings. The Settings button may be used to set parameters for the device connection to an AudioCast Analysis System/Service 705. When the Analyze button is clicked, a sample of the sound from the device ID (701) is streamed to the AudioCast Analysis System URL (702). A single audio stream (703) is streamed to the Receiver URL (704) that is connected to the Analysis Service/Server (705). The sound received is compared with the sound library (706) and when a matching sound is identified, a text message containing the results of the analysis is sent back to the AudioCast app (700) and may be displayed on a screen (708). The volume and mute buttons on the AudioCast app (700) is used to manage the sound when taking the sample sound.

In other embodiments, it may also be the case where the analysis and sound library is self-contained in the AudioCast app (700) obviating the need for the additional analysis service/server (705).

Automobile External Audio Collection Device Example

There are times when it is desirable to hear sounds outside of a vehicle with the windows closed, for example in very cold or rainy weather. One example is when police are on patrol, many will leave a window open to hear if someone cries for help or the sound of a crime occurring. An Audio Collection Device that aids in hearing when the windows are fully closed in these situations would be useful. This problem may be solved with an exemplary ACD device with a specialized microphone that eliminates wind and weather noise (see FIG. 8).

Figure 8:
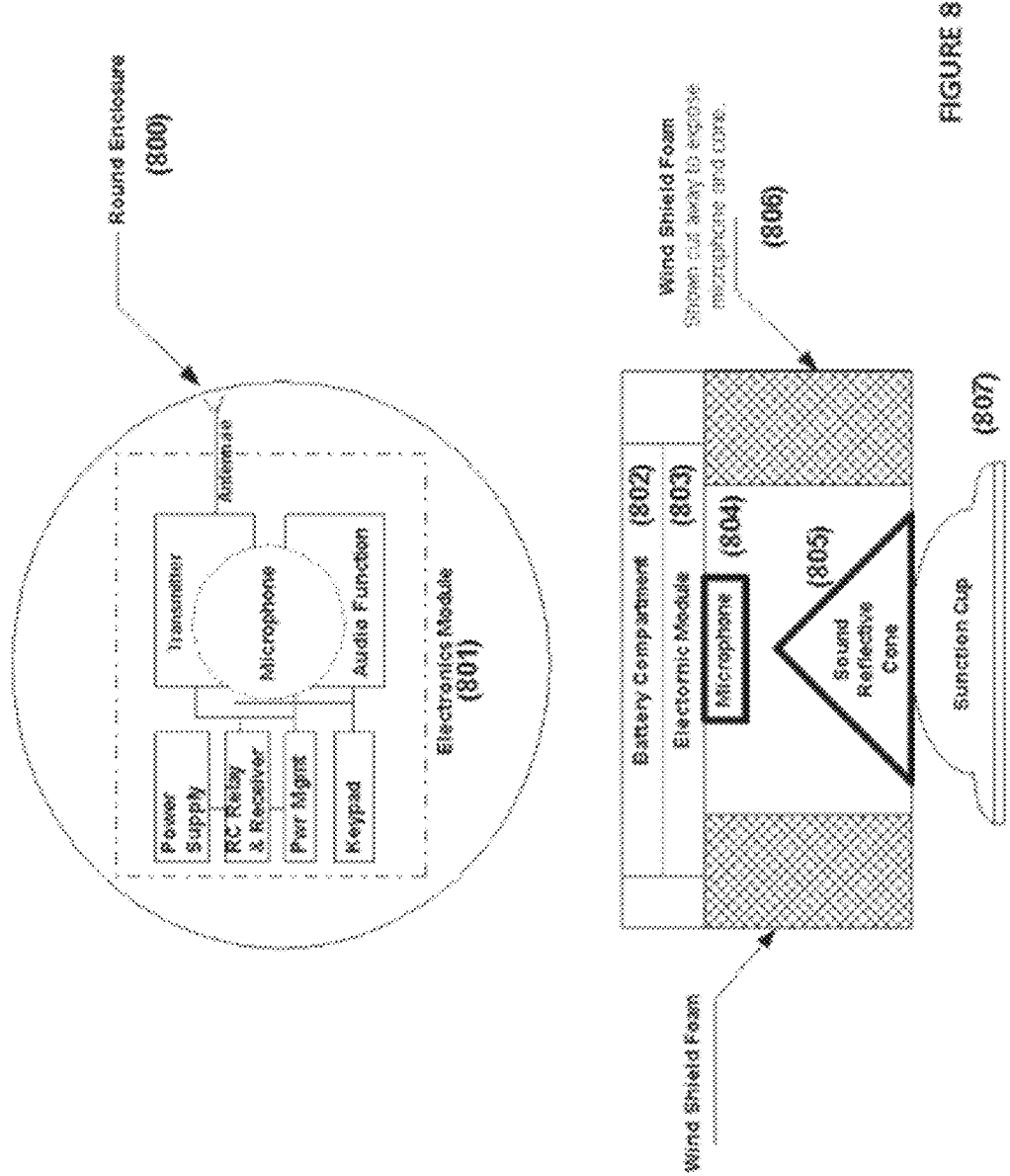
FIG. 8 illustrates an exemplary Audio Collection Device, Automobile example.

In one example, as illustrated in FIG. 8, the electronics may be mounted with the microphone facing down toward a cone, the cone contained in a round 360-degree enclosure surrounded by a wind screen. As sound enters through the wind screen it is reflected upward toward the cone. However, if water enters through the wind screen, it is reflected downward by gravity and around the cone where it drains out away from the microphone through holes at the bottom of the enclosure (not shown), due to negative pressure when travel is occurring.

Referring to FIG. 8, for power, a battery compartment (802) is available obviating the need for power from the vehicle. Although a vehicle power option could also be made available (and therefore, batteries are not needed for that configuration). The associated electronics (803) similar to those already described previously in connection with an ACD of, e.g., FIG. 1A are mounted on a round PCB for the purpose of this type of car mounted ACD with the microphone (804) facing downward. Below the microphone is the sound reflection cone (805) used to reflect 360 degrees of sound upward toward the microphone. The entire device is covered with wind shield foam (806) shown cut away, to display the internal components described. On the bottom is a fastening device/function (807) to fasten the ACD to the vehicle.

Standard Form Factors

Figure 9:
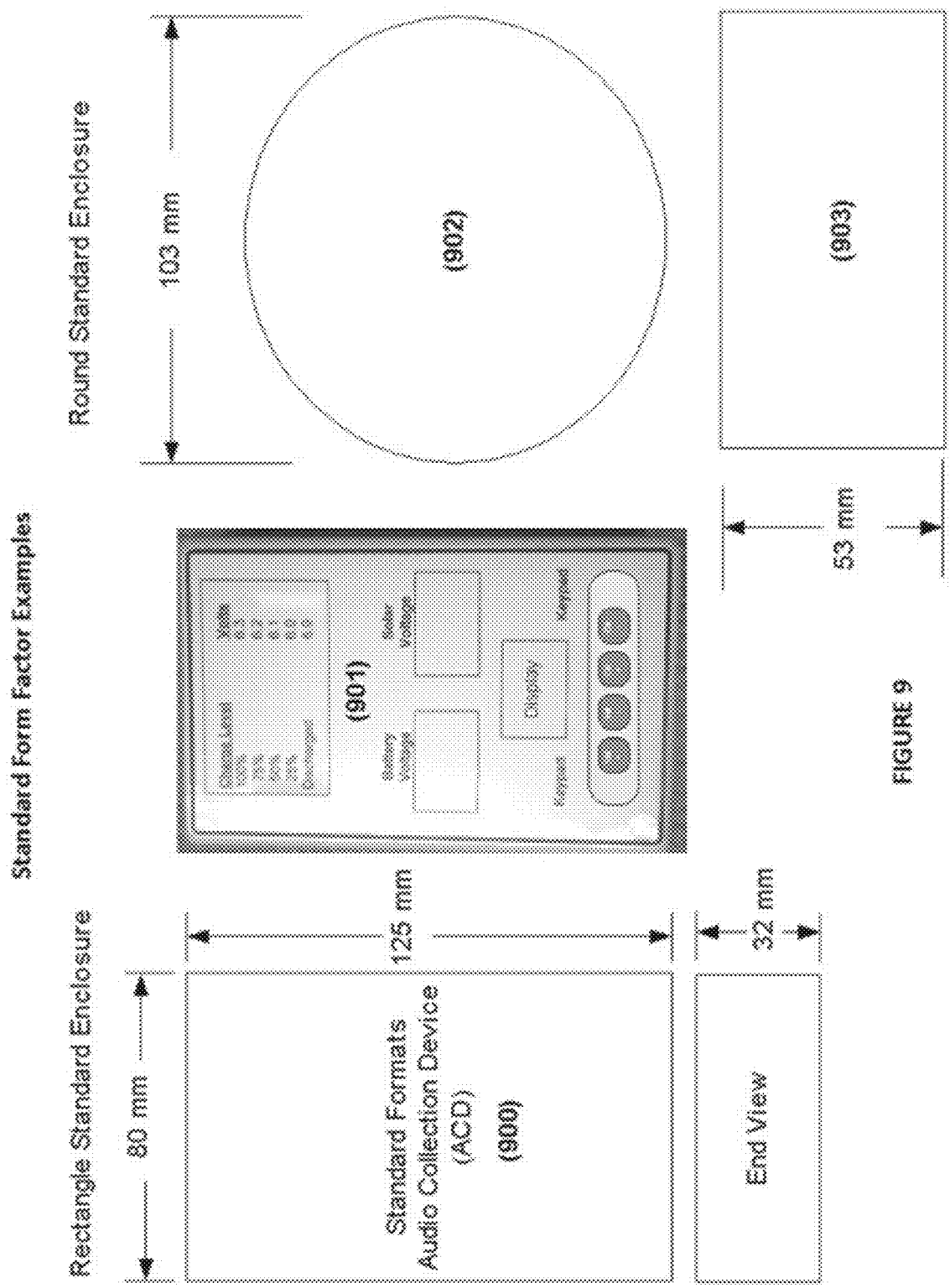
FIG. 9 illustrates Standard Form Factor examples.

Using a standard form factor for present exemplary devices allows for simpler manufacturing, components, and logistics. As shown in FIG. 9, two standard enclosures are shown for an ACD example: 1) a round enclosure (D: 103 mm×H: 53 mm as shown, (902) and (903) used for some 360-degree configurations), and 2) a rectangular enclosure (W: 80 mm×L: 125 mm×H: 32 mm, (900)). These enclosures may be also used for an exemplary ADD implementation.

The rectangular enclosure (900) was used as a proof of concept bird house. That same enclosure fits well with many other environments like a house window frame, a lamppost, and for drones when put in a horizontal orientation and configured with an Aperture Collection Pin as shown in FIG. 10.

Drone sound Audio Collection Devices

Unmanned aircrafts such as drones have become popular with law enforcement, news reporting, and for personal use. Drones provide excellent aerial views of a specific situation but one area where drones lack is for providing accurate sounds occurring of the aerial view being observed by the drones. A challenge for collecting sounds from drones is managing, reducing, or removing the sound of the drone motors and propellers. One method of solving sound related to drone flights would be to have a drone deploy an ACD at the location during the flight, then retrieve the ACD when the observation is complete.

Figure 10:
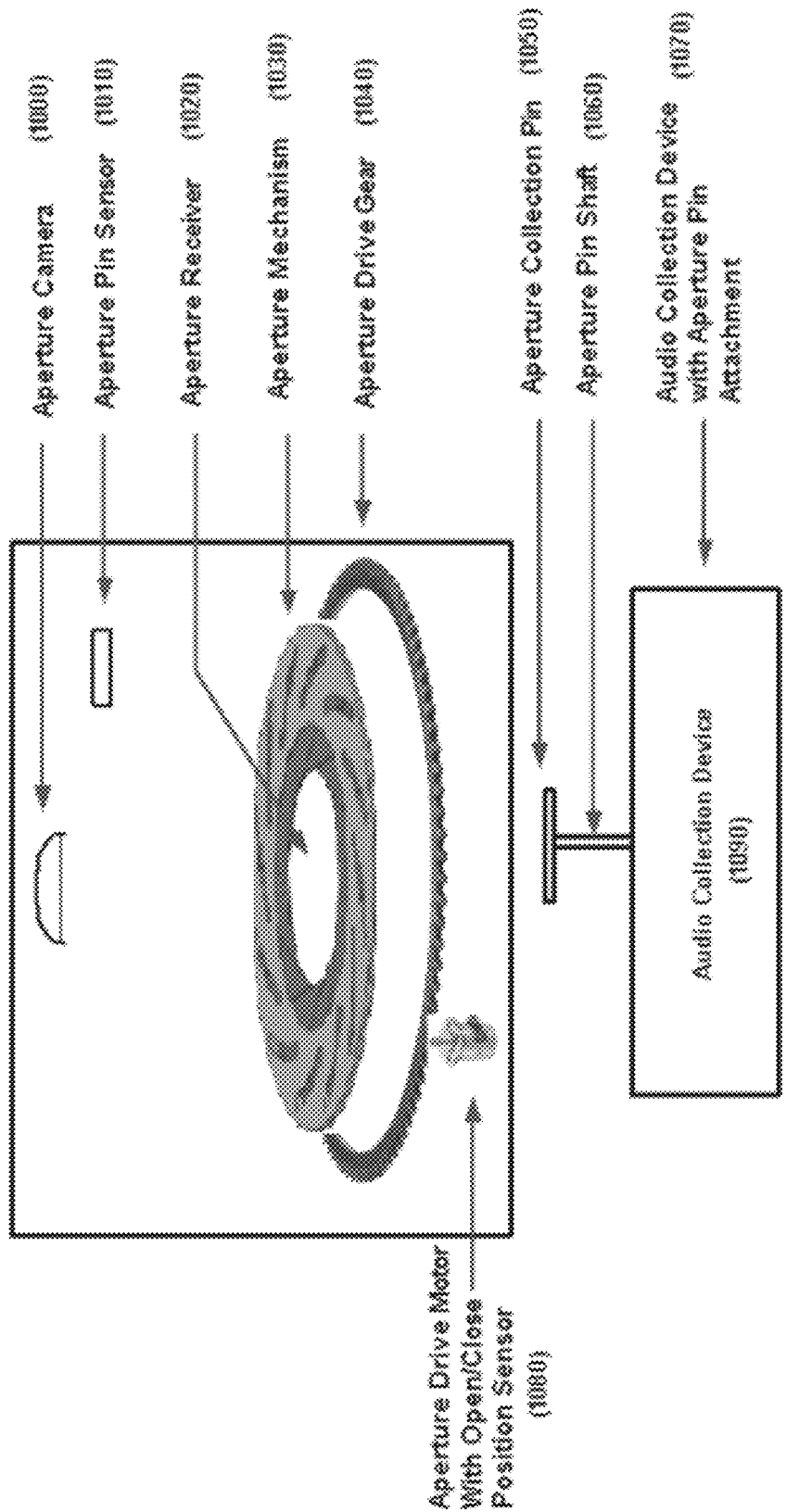
FIG. 10 illustrates exemplary Audio Collection Device, Drone Deploy/Retrieve examples.

Referring to FIG. 10, a parts breakdown is illustrated of an ACD Deploy/Retriever mechanism for a drone deployment example. The ACD Deploy/Retriever is mounted to the bottom of a drone using a wraparound drone fastener, direct screw mount fastener, or other means, like Velcro hook and loop for example (not shown in the figure).

As shown in FIG. 10, The ACD Deploy/Retriever contains an aperture mechanism (1030) that is opened and closed using a drive motor (1080) via a drive gear (1040). There is a position sensor related to the drive motor and drive gear that indicates the status of the aperture open and closed diameter. Also shown is an aperture pin sensor (1010) that indicates when the aperture pin is inserted into the ACD deploy/retriever. It is also noted that one skilled in the art would realize that the aperture mechanism could be opened/closed by alternative means, for example, a bell-crank connected to a rotary slide connected to the aperture mechanism, or a solenoid connected to a rotary slide connected to the aperture mechanism, or a spring actuated close mechanism that closes the aperture when the aperture collection pin (1050) makes contact with a spring release located in the ACD. In the case of the spring actuated mechanism, a solenoid or motor would be used to lock open the aperture either to deploy or make ready for another retrieval.

An exemplary operation of the ACD Deploy/Retriever shown in FIG. 10 is as follows. Referring to FIG. 10, the aperture collection and retrieval pin (1050) is inserted into the ACD Deploy/Retriever aperture (1020) and then the aperture closes around the pin attaching it to the drone. When the aperture collection and retrieval pin (1050) is sensed fully inserted by the aperture pin sensor (1010) or the aperture pin is viewed by an aperture camera (1000), then the drive motor (1080) operates causing the drive gear (1040) to close the aperture (1020) holding the ACD to the drone. Alternatively, a wireless control signal via FOB or a button on the drone controller using remote control relays may cause the drive motor (1080) to operate (opening or closing).

The sensor on the motor (or a counter on a stepper motor) determines if the aperture is open or closed and stops the drive motor (1080) at the desired point. A person skilled in the art would realize that the open close sensor may be done using alternate methods, for example, an encoder motor that counts slots in a disk for position, a light sensor, or a current sensor. Other sensors such as limit sensors may be some other examples which may indicate when limits are reached.

Multiple Audio Collection Devices may be deployed in one of the configurations described above (e.g., in FIG. 6—Multicast or Multicast Dimensional). Due to the addressing of Audio Collection Devices, audio streams may be muted or brought online based on sounds near a specific area of the aerial view. The audio stream may also be modified in real-time with a smart phone app or a PC using features to remove background noise, normalize audio levels, amplify human voices, or adding or removing a specific sound.

Drone Onboard Audio

An Audio Collection Device (ACD) adapted with a unidirectional 360-degree microphone with windshield could be added to the drone as an accessory. While unidirectional 360-degree sounds contradictory, in fact the ACD would collect sound 360 degrees below the drone but be unidirectional for all sounds above the ACD (i.e. the drone motors) to reduce any motor audio from being captured. Such an exemplary done ACD is illustrated in FIG. 11.

Figure 11:
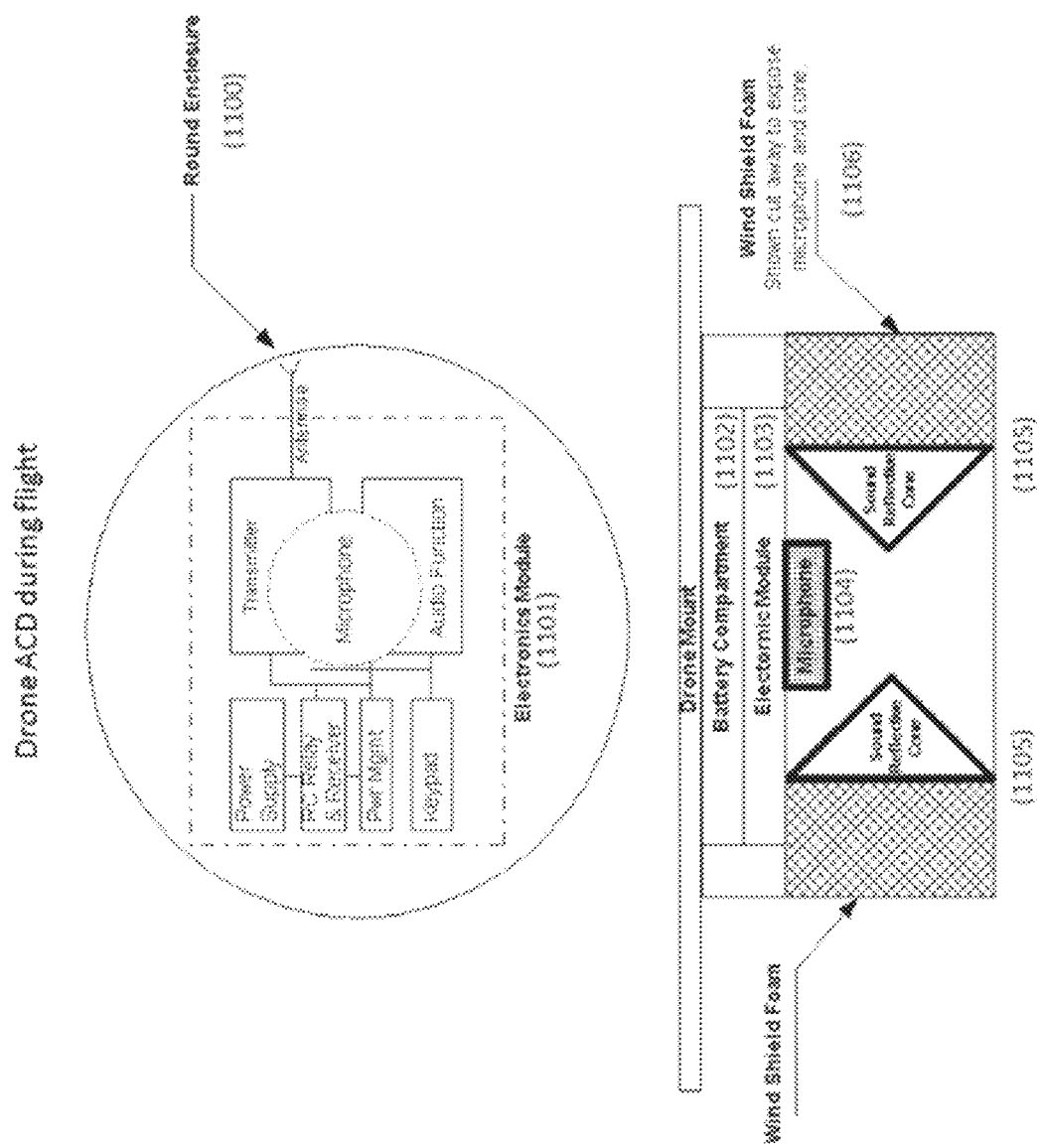
FIG. 11 illustrates exemplary Audio Collection Device, Drone Audio Collection during a flight.

Referring to FIG. 11, the drone ACD is similar to the automobile ACD (shown in FIG. 8, and described previously) with a different configuration for the microphone/sound capture. Using the standard round enclosure (1100), there is an electronics PCB (1103) and battery (1102) similar to those already described previously in connection with an ACD of, e.g., FIG. 1A, and a battery compartment (1103) to supply power to the device. Below the electronics PCB is the microphone (1104) facing downward. Around the microphone is a funnel/hourglass or cone shaped component (1105) made from foam or other material that directs sound waves from below the drone inward toward the microphone and dampens sounds that are not directly below the drone (i.e. motor and propeller noise). A wind shield foam (1106) surrounds the entire microphone and cone/hourglass area.

Other Use Examples for ACD and Audio Collection System

Sports Helmets

Another example of present embodiments may be sports helmets with Audio Collection Device which may provide a player's audio experience of a game. Football and other sports games have many fans and a game enhancement may be the audio and sounds of the players on the field. This may be provided as a premium service and adds new dimensions to the game experience. In this case, Audio Collection Devices may be incorporated into a football helmet for example, and when a player is on the field, the audio stream is unmuted, normalized, and sent to an ADD. The streams would be sent via, e.g., a Multi-cast configuration, allowing either the game program broadcaster or the fans to control which streams are online or muted at any given time.

Dogs or other Animal Audio Collection Devices

Pet owners are passionate about their pets and typically like to have any information available about their pets. Adding an Audio Collection Device to a pet's collar that transmits an audio sound stream to a cell phone app would be beneficial allowing a pet owner to hear sounds around and of the pet. Moreover, it would allow the pet owner to determine if the pet was in a stressful and potentially dangerous situation. The ACD and ADD could be applied to monitor pets while a person is at work for example.

Another Exemplary Device

Figure 12:
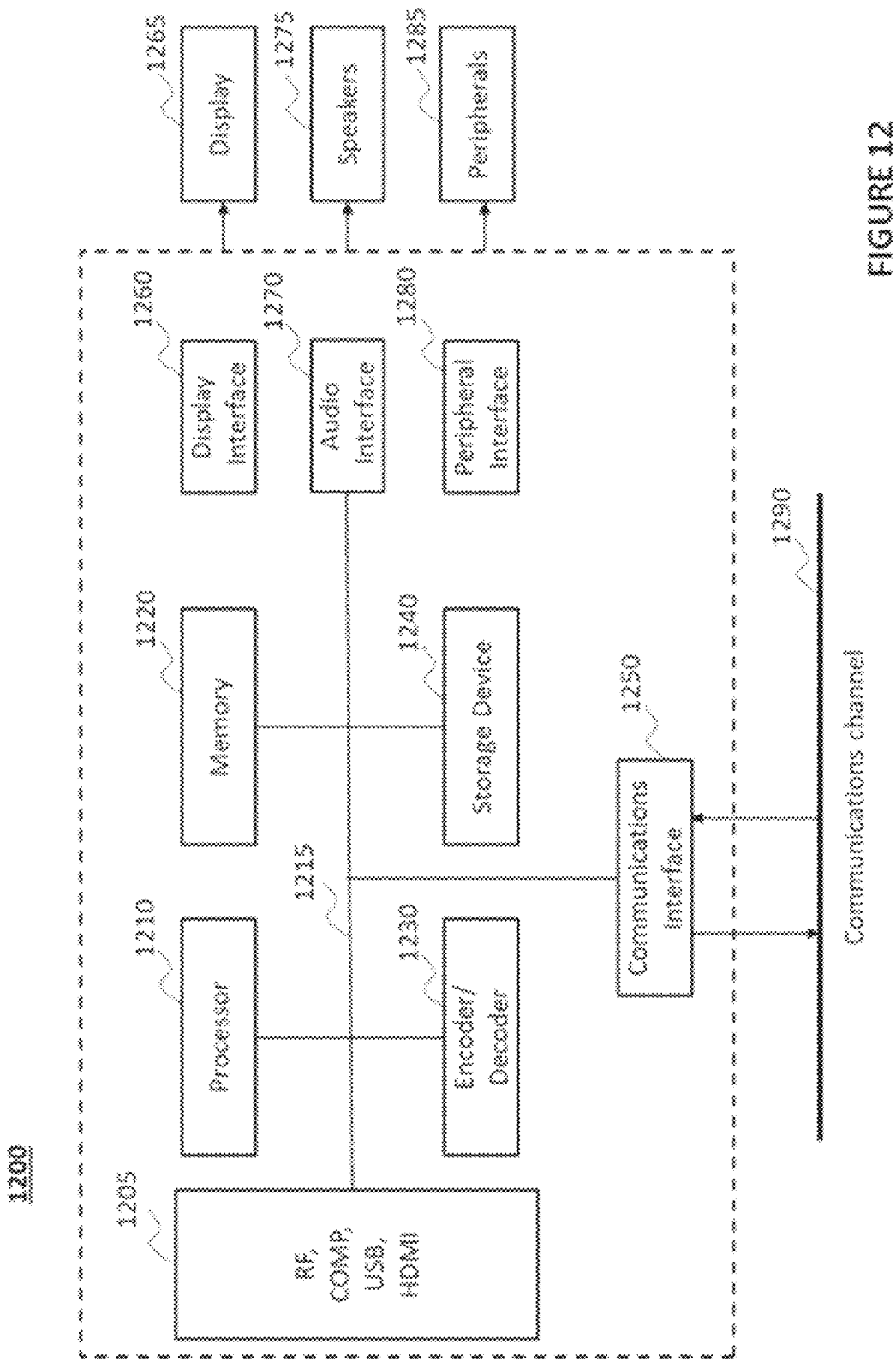
FIG. 12 illustrates an exemplary device 1200.

FIG. 12 illustrates a block diagram of an example of a system 1200 in which various aspects and embodiments may be implemented. System 1200 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video/audio recording systems, connected home appliances, and servers. Elements of system 1200, singly or in combination, may be embodied in a single integrated circuit, multiple ICs, and/or discrete components. For example, in at least one embodiment, the processing and encoder/decoder elements of system 1200 are distributed across multiple ICs and/or discrete components. In various embodiments, the system 1200 is communicatively coupled to other similar systems, or to other electronic devices, via, for example, a communications bus or through dedicated input and/or output ports. In various embodiments, the system 1200 is configured to implement one or more of the aspects described in this document, for example, as an exemplary device for implementing an exemplary ACD, ADD, an Audio Collection system server, cloud or web site/service.

The system 1200 includes at least one processor 1210 configured to execute instructions loaded therein for implementing, for example, the various aspects described in this document. Processor 1210 may include embedded memory, input output interface, and various other circuitries as known in the art. The system 1200 includes at least one memory 1220 (e.g., a volatile memory device, and/or a non-volatile memory device). System 1200 includes a storage device 1240, which may include non-volatile memory and/or volatile memory, including, but not limited to, EEPROM, ROM, PROM, RAM, DRAM, SRAM, flash, magnetic disk drive, and/or optical disk drive. The storage device 1240 may include an internal storage device, an attached storage device, and/or a network accessible storage device, as non-limiting examples.

System 1200 includes an encoder/decoder module 1230 configured, for example, to process data to provide an encoded video/audio or decoded video/audio, and the encoder/decoder module 1230 may include its own processor and memory. The encoder/decoder module 1230 represents module(s) that may be included in a device to perform the encoding and/or decoding functions. As is known, a device may include one or both of the encoding and decoding modules. Additionally, encoder/decoder module 1230 may be implemented as a separate element of system 1200 or may be incorporated within processor 1210 as a combination of hardware and software as known to those skilled in the art.

Program code to be loaded onto processor 1210 or encoder/decoder 1230 to perform the various aspects described in this document may be stored in storage device 1240 and subsequently loaded onto memory 1220 for execution by processor 1210. In accordance with various embodiments, one or more of processor 1210, memory 1220, storage device 1240, and encoder/decoder module 1230 may store one or more of various items during the performance of the processes described in this document. Such stored items may include, but are not limited to, the input video/audio, the decoded video/audio or portions of the decoded video/audio, the bitstream, matrices, variables, and intermediate or final results from the processing of equations, formulas, operations, and operational logic.

In several embodiments, memory inside of the processor 1210 and/or the encoder/decoder module 1230 is used to store instructions and to provide working memory for processing that is needed during encoding or decoding. In other embodiments, however, a memory external to the processing device (for example, the processing device may be either the processor 1210 or the encoder/decoder module 1230) is used for one or more of these functions. The external memory may be the memory 1220 and/or the storage device 1240, for example, a dynamic volatile memory and/or a non-volatile flash memory. In several embodiments, an external non-volatile flash memory is used to store the operating system of a television. In at least one embodiment, a fast, external dynamic volatile memory such as a RAM is used as working memory for video/audio coding and decoding operations, such as for MPEG-2, HEVC, or VVC (Versatile Video/audio Coding).

The input to the elements of system 1200 may be provided through various input devices as indicated in block 1205. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1205 have associated respective input processing elements as known in the art. For example, the RF portion may be associated with elements necessary for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 1200 to other electronic devices across USB and/or HDMI connections. It is to be understood that various aspects of input processing, for example, Reed-Solomon error correction, may be implemented, for example, within a separate input processing IC or within processor 1210 as necessary. Similarly, aspects of USB or HDMI interface processing may be implemented within separate interface ICs or within processor 1210 as necessary. The demodulated, error corrected, and demultiplexed stream is provided to various processing elements, including, for example, processor 1210, and encoder/decoder 1230 operating in combination with the memory and storage elements to process the data stream as necessary for presentation on an output device.

Various elements of system 1200 may be provided within an integrated housing. Within the integrated housing, the various elements may be interconnected and transmit data therebetween using suitable connection arrangement 1215, for example, an internal bus as known in the art, including the I2C bus, wiring, and printed circuit boards.

The system 1200 includes communication interface 1250 that enables communication with other devices via communication channel 1260. The communication interface 1250 may include, but is not limited to, a transceiver configured to transmit and to receive data over communication channel 1290. The communication interface 1250 may include, but is not limited to, a modem or network card and the communication channel 1290 may be implemented, for example, within a wired and/or a wireless medium.

Data is streamed to the system 1200, in various embodiments, using a Wi-Fi network such as IEEE 802.11. The Wi-Fi signal of these embodiments is received over the communications channel 1290 and the communications interface 1250 which are adapted for Wi-Fi communications. The communications channel 1290 of these embodiments is typically connected to an access point or router that provides access to outside networks including the Internet for allowing streaming applications and other over-the-top communications. Other embodiments provide streamed data to the system 1200 using a set-top box that delivers the data over the HDMI connection of the input block 1205. Still other embodiments provide streamed data to the system 1200 using the RF connection of the input block 1205.

The system 1200 may provide an output signal to various output devices, including a display 1265, speakers 1275, and other peripheral devices 1285. The other peripheral devices 1285 include, in various examples of embodiments, one or more of a stand-alone DVR, a disk player, a stereo system, a lighting system, and other devices that provide a function based on the output of the system 1200. In various embodiments, control signals are communicated between the system 1200 and the display 1265, speakers 1275, or other peripheral devices 1285 using signaling such as AV.Link, CEC, or other communications protocols that enable device-to-device control with or without user intervention. The output devices may be communicatively coupled to system 1200 via dedicated connections through respective interfaces 1260, 1270, and 1280. Alternatively, the output devices may be connected to system 1200 using the communications channel 1290 via the communications interface 1250. The display 1265 and speakers 1275 may be integrated in a single unit with the other components of system 1200 in an electronic device, for example, a television. In various embodiments, the display interface 1260 includes a display driver, for example, a timing controller (T Con) chip.

The display 1265 and speaker 1275 may alternatively be separate from one or more of the other components, for example, if the RF portion of input 1205 is part of a separate set-top box. In various embodiments in which the display 1265 and speakers 1275 are external components, the output signal may be provided via dedicated output connections, including, for example, HDMI ports, USB ports, or COMP outputs.

The embodiments may be carried out by computer software implemented by the processor 1210 or by hardware, or by a combination of hardware and software. As a non-limiting example, the embodiments may be implemented by one or more integrated circuits. The memory 1220 may be of any type appropriate to the technical environment and may be implemented using any appropriate data storage technology, such as optical memory devices, magnetic memory devices, semiconductor-based memory devices, fixed memory, and removable memory, as non-limiting examples. The processor 1210 may be of any type appropriate to the technical environment, and may encompass one or more of microprocessors, general purpose computers, special purpose computers, and processors based on a multi-core architecture, as non-limiting examples.

Various implementations involve decoding. "Decoding", as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video/audio sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches may also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

ACD Birdhouse Enclosure Examples

Figure 13:
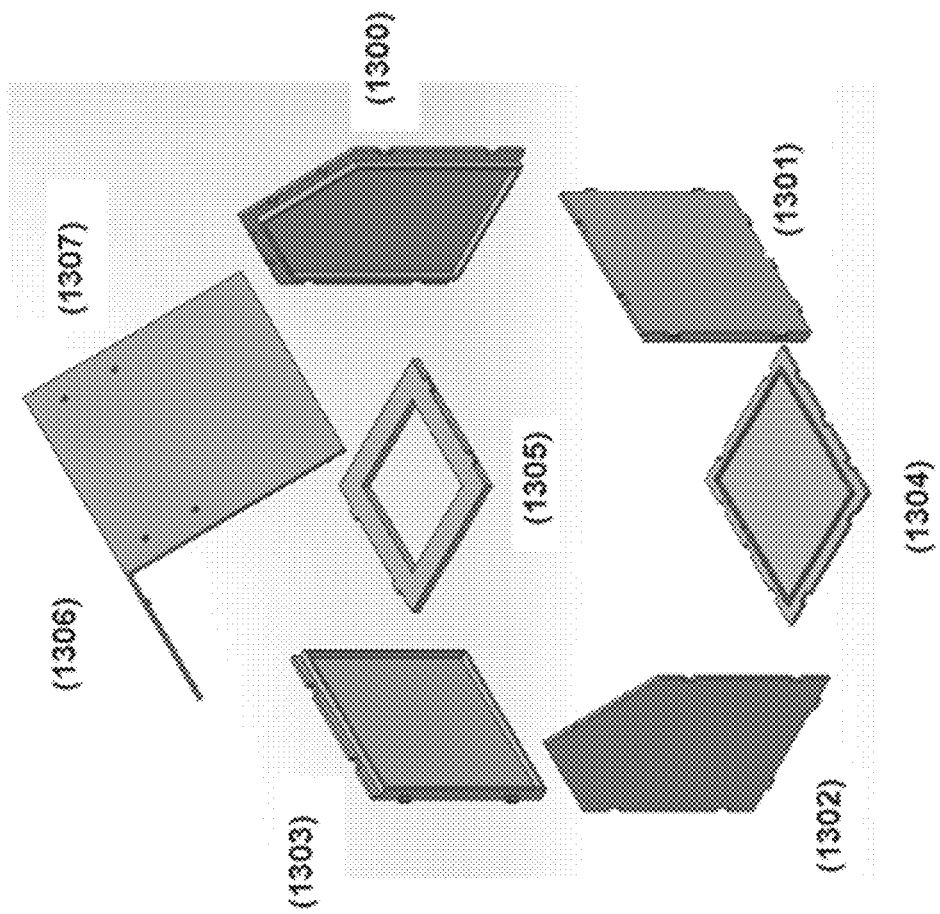
FIG. 13 illustrates an exemplary birdhouse enclosure using snap panels.

FIG. 13 illustrates an exemplary birdhouse enclosure that comprises separate panels which can be snapped together for quick and easy manufacturing purposes. The roof panels (1306, 1307) snap onto a support structure (1305) that also snaps into the birdhouse sides (1300, 1301, 1302, 1303). The sides (1300, 1301, 1302, 1303) also snap onto the bottom (1304). The front side (1300) may contain a perch stick (not shown) which may also be used as a handle to remove the front side (1300) and provides access to the standard ACD electronics enclosure (e.g., FIG. 1A, 112, 103), battery, and wiring for the photovoltaic cells (not shown in this figure).

Figure 15:
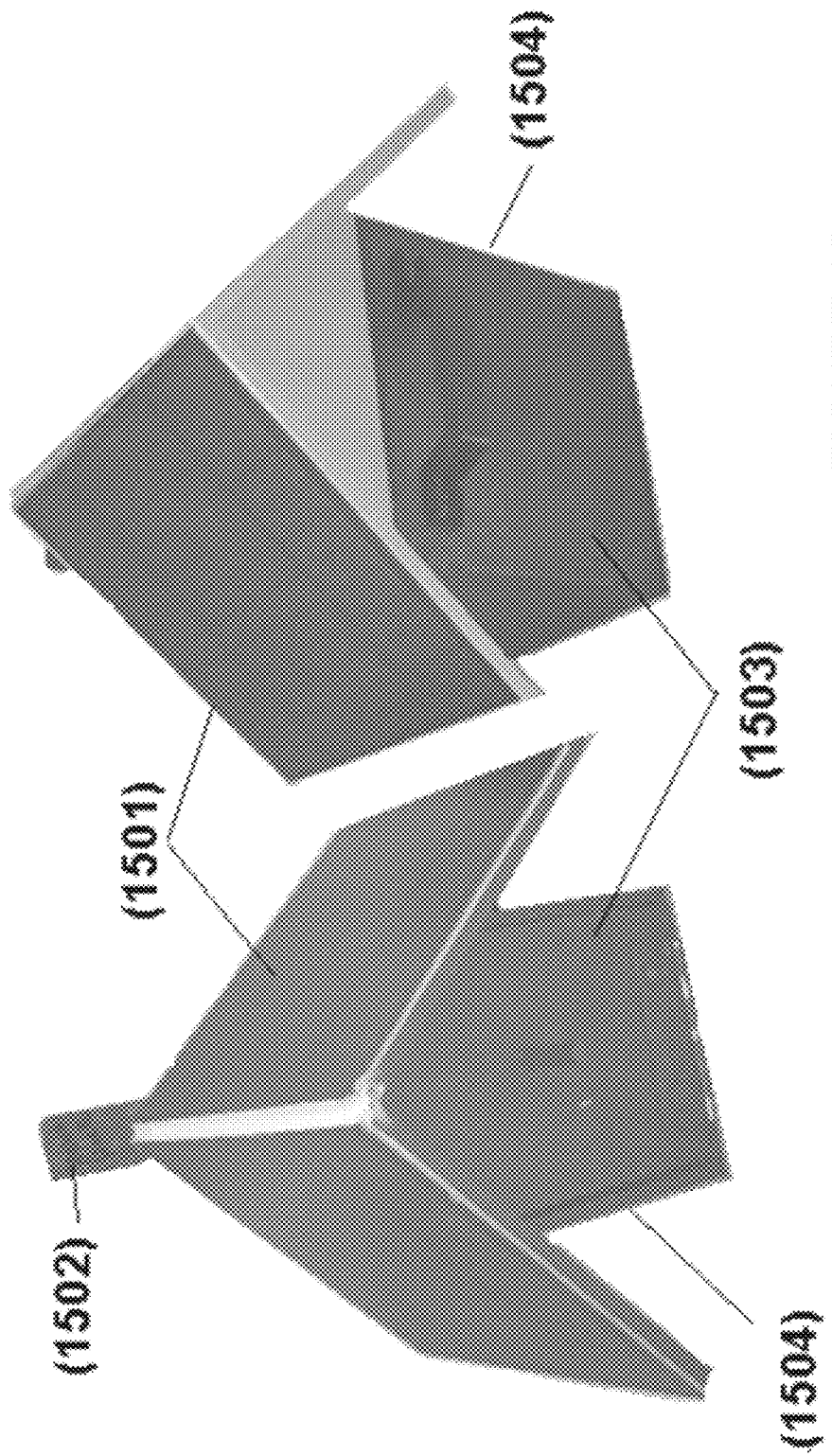
FIG. 15 illustrates exemplary bird house enclosures.

Additionally, FIG. 15 illustrates two other prototype bird house enclosure examples. Two front door designs are shown (1503), one operates using hinges and the other snaps onto the enclosure. A hook assembly (1502) is shown. The hook assembly (1502) comprises two separate pieces, 1 side (a pin) is attached to a structure via screws (not shown), and a hook (1502) slides over the pin, allowing the enclosure to be easily removed from the structure to accommodate any maintenance or AC charging. Also shown on the roof are two 500 milliamp solar cells for battery charging (1501). The peak design allows sunlight to be captured as the sun moves across the sky. A flat roof with a solar cell may also be used, however, a reduced solar cell output may occur.

Accordingly, the implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information may include one or more of, for example, estimating the information, calculating the information, predicting the information, or retrieving the information from memory.

Further, this document may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters. In this way, in an embodiment the same parameter is used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

We describe a number of embodiments. Features of these embodiments may be provided alone or in any combination. Various other generalized, as well as particularized, aspects, embodiments and claims are also supported and contemplated throughout this disclosure. Unless indicated otherwise, or technically precluded, the aspects described in this application may be used individually or in combination.

Exemplary Source Code Listing and Overview

1) An example reference for creating an ACD device using an Android smart phone including features:
   a) Connect—Connection to an ACD system
   b) Mute—Audio management
   c) Stream Audio to IP address—Sending audio to the Audio Collection System 2) Example source code reference:
   The examples below are listed as reference and will be recognized and understood by a person skilled in the art. Typical source code examples like this can be found on open source web sites like https://github-.com.

3) Referring to FIG. 2, Define the user Connect and Mute interface buttons as listed:

```
Android XML:
<RelativeLayout
    xmlns:android="http://schemas.android.com/apk/res/android"
    xmlns:tools="http://schemas.android.com/tools"
    android:layout_width="match_parent"
    android:layout_height="match_parent"
    android:paddingBottom="@dimen/activity_vertical_margin"
    android:paddingLeft="@dimen/activity_horizontal_margin"
    android:paddingRight="@dimen/activity_horizontal_margin"
    android:paddingTop="@dimen/activity_vertical_margin"
    tools:context=".MainActivity" >
    <TextView
        android:id="@+id/textView1"
        android:layout_width="wrap_content"
        android:layout_height="wrap_content"
        android:text="@string/hello_world" />
    <Button
        android:id="@+id/connect_button"
        android:layout_width="wrap_content"
        android:layout_height="wrap_content"
        android:layout_below="@+id/textView1"
        android:layout_centerHorizontal="true"
        android:layout_marginTop="130dp"
        android:text="Connect" />
    <Button
        android:id="@+id/mute_button"
        android:layout_width="wrap_content"
        android:layout_height="wrap_content"
        android:layout_alignLeft="@+id/button1"
        android:layout_below="@+id/button1"
        android:layout_marginTop="64dp"
        android:text="Mute" />
</RelativeLayout>
```

4) Source code example to execute when a button is clicked on the smart phone app user interface.
   For brevity the settings button (and related keypad) source code is omitted and the IP Address is hardcoded (see: InetAddress.getByName ("192.168.1.5")) in the run time code below, however one skilled in the art would easily realize how to create a variable and to query the user to provide an IP address or domain address to stream audio to:

```
package com.example.mictest2;
import java.io.IOException;
import java.net.DatagramPacket;
import java.net.Datagramsocket;
import java.net.InetAddress;
import java.net.UnknownHostException;
import android.app.Activity;
import android.media.AudioFormat;
import android.media.AudioRecord;
import android.media.MediaRecorder;
import android.os.Bundle;
import android.util.Log;
import android.view.View;
import android.view.View.OnClickListener;
import android.widget.Button;
public class Send extends Activity {
private Button connectButton,muteButton;
public byte[ ] buffer;
public static DatagramSocket socket;
private int port=50005;
AudioRecord recorder;
private int sampleRate = 16000 ; // 44100
private int channelConfig = AudioFormat.CHANNEL_IN_MONO;
private int audioFormat = AudioFormat.ENCODING_PCM_16BIT;
int minBufSize = AudioRecord.getMinBufferSize(sampleRate,
channelConfig, audioFormat);
private boolean status = true;
@Override
public void onCreate(Bundle savedInstanceState) {
```

-continued

```
        super.onCreate(savedInstanceState);
        setContentView(R.layout.activity_main);
        connectButton = (Button) findViewById (R.id.start_button);
        muteButton = (Button) findViewById (R.id.stop_button);
        connectButton.setOnClickListener (startListener);
        muteButton.setOnClickListener (stopListener);
    }
    private final OnClickListener stopListener = new OnClickListener( ) {
        @Override
        public void onClick(View arg0) {
            status = false;
            recorder.release( );
            Log.d("VS","Recorder released");
        }
    };
    private final OnClickListener startListener = new OnClickListener( ) {
        @Override
        public void onClick(View arg0) {
            status = true;
            startStreaming( );
        }
    };
```

The invention claimed is:

1. A system for audio collection, comprising:
an audio collection device configured to capture sound at a location of the audio collection device, wherein the audio collection device comprising at least:
a wireless receiver configured to receive a power on or power off signal for powering on or powering off the audio collection device,
a microphone configured to capture the sound,
a wireless transmitter configured to transmit the captured sound;
an audio distribution device configured to distribute the captured sound from the audio collection device, wherein the audio distribution device comprising at least:
a wireless receiver configured to receive the captured sound from the audio collection device,
a power on or power off controller configured to power on or power off the audio distribution device and generate the power on or power off signal for powering on or powering off the audio collection device, in response to a same remote control being activated for turning on or turning off the audio distribution device; and
wherein the audio collection device further comprising a sound reflective cone, surrounded by a wind shielding material.

2. The system of claim 1, wherein the audio collection device further comprising a photovoltaic cell for charging a battery configured to power the audio collection device.

3. The system of claim 1, wherein the audio collection device further comprising a battery configured to power the audio collection device, at least a voltage monitor configured to monitor a voltage of the battery and a voltage of a photovoltaic cell for charging the battery.

4. A system for audio collection, comprising:
an audio collection device configured to capture sound at a location of the audio collection device, wherein the audio collection device comprising at least:
a wireless receiver configured to receive a power on or power off signal for powering on or powering off the audio collection device,
a microphone configured to capture the sound,
a wireless transmitter configured to transmit the captured sound;
an audio distribution device configured to distribute the captured sound from the audio collection device, wherein the audio distribution device comprising at least:
a wireless receiver configured to receive the captured sound from the audio collection device,
a power on or power off controller configured to power on or power off the audio distribution device and generate the power on or power off signal for powering on or powering off the audio collection device, in response to a same remote control being activated for turning on or turning off the audio distribution device; and
wherein the audio collection device is adapted to reduce wind noise during a movement, further comprising: a sound reflective inverted cone having a shape of a mid-section of an hourglass, surrounded by a wind shielding material.

5. A system for audio collection, comprising:
an audio collection device configured to capture sound at a location of the audio collection device, wherein the audio collection device comprising at least:
a wireless receiver configured to receive a power on or power off signal for powering on or powering off the audio collection device,
a microphone configured to capture the sound,
a wireless transmitter configured to transmit the captured sound;
an audio distribution device configured to distribute the captured sound from the audio collection device, wherein the audio distribution device comprising at least:
a wireless receiver configured to receive the captured sound from the audio collection device,
a power on or power off controller configured to power on or power off the audio distribution device and generate the power on or power off signal for powering on or powering off the audio collection device, in response to a same remote control being activated for turning on or turning off the audio distribution device; and
wherein the audio collection device further comprising an aperture collection or retrieval pin, and wherein the pin comprising a shaft with a wider diameter flat head at a top capable of fitting into an aperture when open and being held firmly when the aperture is closed.

6. A system for audio collection, comprising:
a plurality of audio collection devices configured to capture a respective sound at a respective location of the plurality of audio collection devices, wherein at least one of the plurality of audio collection devices comprises at least:
a wireless receiver configured to receive a power on or power off signal for powering on or powering off the at least one of the plurality of audio collection devices,
a microphone configured to capture the respective sound,
a wireless transmitter configured to transmit the captured respective sound;
a plurality of audio distribution devices configured to distribute the captured respective sound, wherein at least one of the plurality of audio distribution devices comprising:
a wireless receiver configured to receive the captured respective sound from the at least one of the plurality of audio collection devices,
a power on or power off controller configured to power on or power off the at least one of the plurality of audio distribution devices and generate the power on or power off signal for powering on or powering off the least one of the plurality of audio collection devices, in response to a same remote control being activated for turning on or turning off the least one of the plurality of audio distribution devices; and at least one remote server configured to receive, process and store the respective captured sound from the plurality of audio collection devices, and wherein the at least one remote server is configured to process the respective captured sound from the plurality of audio collection devices by removing one or more selected types of sound.

7. The system of claim 6 wherein the selected types of sound comprises one or more of: 1) ambient noise, 2) wind noise, and 3) one or more of audio frequencies.

8. The system of claim 6, wherein the at least one of the plurality of audio collection devices further comprises a photovoltaic cell for charging a battery configured to power at least one of the plurality of audio collection devices.

9. The system of claim 8, wherein the at least one of the plurality of audio collection devices further comprising a battery, and a voltage monitor configured to monitor a voltage of the battery.

10. The system of claim 6 wherein the at least one remote server is configured to provide access to the respective captured sound from the plurality of audio collection devices together with other associated non-audio content.

11. The system of claim 10 wherein the access is provided to one or more of the plurality of the audio distribution devices.

12. A system for audio collection, comprising:
a plurality of audio collection devices configured to capture a respective sound at a respective location of the plurality of audio collection devices, wherein at least one of the plurality of audio collection devices comprises at least:
a wireless receiver configured to receive a power on or power off signal for powering on or powering off the at least one of the plurality of audio collection devices,
a microphone configured to capture the respective sound,
a wireless transmitter configured to transmit the captured respective sound;
a plurality of audio distribution devices configured to distribute the captured respective sound, wherein at least one of the plurality of audio distribution devices comprising:
a wireless receiver configured to receive the captured respective sound from the at least one of the plurality of audio collection devices,
a power on or power off controller configured to power on or power off the at least one of the plurality of audio distribution devices and generate the power on or power off signal for powering on or powering off the least one of the plurality of audio collection devices, in response to a same remote control being activated for turning on or turning off the least one of the plurality of audio distribution devices; and
wherein the at least one of the plurality of audio collection devices further comprises a sound reflective cone, surrounded by a wind shielding material.

13. A system for audio collection, comprising:
a plurality of audio collection devices configured to capture a respective sound at a respective location of the plurality of audio collection devices, wherein at least one of the plurality of audio collection devices comprises at least:
a wireless receiver configured to receive a power on or power off signal for powering on or powering off the at least one of the plurality of audio collection devices,
a microphone configured to capture the respective sound,
a wireless transmitter configured to transmit the captured respective sound;
a plurality of audio distribution devices configured to distribute the captured respective sound, wherein at least one of the plurality of audio distribution devices comprising:
a wireless receiver configured to receive the captured respective sound from the at least one of the plurality of audio collection devices,
a power on or power off controller configured to power on or power off the at least one of the plurality of audio distribution devices and generate the power on or power off signal for powering on or powering off the least one of the plurality of audio collection devices, in response to a same remote control being activated for turning on or turning off the least one of the plurality of audio distribution devices; and
wherein the at least one of the plurality of audio collection devices is adapted to reduce wind noise during a movement, further comprising: a sound reflective inverted cone having a shape of a mid-section of an hourglass, surrounded by a wind shielding material.

14. A system for audio collection, comprising:
a plurality of audio collection devices configured to capture a respective sound at a respective location of the plurality of audio collection devices, wherein at least one of the plurality of audio collection devices comprises at least:
a wireless receiver configured to receive a power on or power off signal for powering on or powering off the at least one of the plurality of audio collection devices,
a microphone configured to capture the respective sound,
a wireless transmitter configured to transmit the captured respective sound;
a plurality of audio distribution devices configured to distribute the captured respective sound, wherein at least one of the plurality of audio distribution devices comprising:
a wireless receiver configured to receive the captured respective sound from the at least one of the plurality of audio collection devices,
a power on or power off controller configured to power on or power off the at least one of the plurality of audio distribution devices and generate the power on or power off signal for powering on or powering off the least one of the plurality of audio collection devices, in response to a same remote control being activated for turning on or turning off the least one of the plurality of audio distribution devices; and
wherein the at least one of the plurality of audio collection devices further comprising an aperture collection or retrieval pin, and wherein the pin comprising a shaft with a wider diameter flat head at a top capable of fitting into an aperture when open and being held firmly when the aperture is closed.

* * * * *